(12) United States Patent
Jo et al.

(10) Patent No.: US 12,115,898 B2
(45) Date of Patent: Oct. 15, 2024

(54) DELIVERY ROBOT CONTROL APPARATUS AND METHOD THEREOF

(71) Applicants: HYUNDAI MOTOR COMPANY, Seoul (KR); KIA CORPORATION, Seoul (KR); MOBINN Inc., Suwon-si (KR)

(72) Inventors: Sun Myoung Jo, Ansan-si (KR); Jin Choi, Seoul (KR); Hoon Chung, Hwaseong-si (KR)

(73) Assignees: HYUNDAI MOTOR COMPANY, Seoul (KR); KIA CORPORATION, Seoul (KR); MOBINN Inc., Suwon-si (KR)

(*) Notice: Subject to any disclaimer, the term of this patent is extended or adjusted under 35 U.S.C. 154(b) by 330 days.

(21) Appl. No.: 17/747,543

(22) Filed: May 18, 2022

(65) Prior Publication Data

US 2023/0039357 A1 Feb. 9, 2023

(30) Foreign Application Priority Data

Aug. 4, 2021 (KR) .................. 10-2021-0102734

(51) Int. Cl.
*B60P 1/44* (2006.01)
*B25J 5/00* (2006.01)
*B25J 9/16* (2006.01)
*B25J 19/02* (2006.01)
*B60P 1/38* (2006.01)
(Continued)

(52) U.S. Cl.
CPC ............. *B60P 1/4471* (2013.01); *B25J 5/007* (2013.01); *B25J 9/1664* (2013.01); *B25J 19/023* (2013.01); *B60P 1/38* (2013.01); *B60P 1/4421* (2013.01); *B60P 3/007* (2013.01); *E05F 15/611* (2015.01); *G01S 15/08* (2013.01); *G01S 17/08* (2013.01); *G06T 7/70* (2017.01); *G05B 2219/50391* (2013.01); *Y10S 901/01* (2013.01)

(58) Field of Classification Search
CPC ........ B60P 1/38; B60P 1/4421; B60P 1/4471; B60P 3/007; G01S 15/08; G01S 17/08; G05B 2219/50391; B25J 5/007; B25J 9/1664; B25J 19/023
See application file for complete search history.

(56) References Cited

U.S. PATENT DOCUMENTS

| 10,730,621 B2 | 8/2020 | Goovaerts et al. |
| 2019/0135433 A1 | 5/2019 | Goovaerts et al. |

(Continued)

FOREIGN PATENT DOCUMENTS

| CN | 108557360 A | 9/2018 |
| CN | 208932192 U | 6/2019 |

(Continued)

*Primary Examiner* — Dale Moyer
(74) *Attorney, Agent, or Firm* — Lempia Summerfield Katz LLC

(57) ABSTRACT

A delivery robot control apparatus for controlling a delivery robot to unload an object and a method thereof are disclosed. A camera is provided in the delivery robot having an internal loading space for one or more floors and obtains an image including a door module which is provided in the delivery robot and connected to a frame forming the internal loading space. The controller determines up and low positions of the door module based on the image, and controls a first motor to move the door module to a target position based on the determined up or low position of the door module.

20 Claims, 18 Drawing Sheets

(51) Int. Cl.
*B60P 3/00* (2006.01)
*E05F 15/611* (2015.01)
*G01S 15/08* (2006.01)
*G01S 17/08* (2006.01)
*G06T 7/70* (2017.01)

(56) References Cited

U.S. PATENT DOCUMENTS

2020/0339350 A1  10/2020  Dooley et al.
2021/0096572 A1   4/2021  Jang et al.

FOREIGN PATENT DOCUMENTS

| | | |
|---|---|---|
| JP | 2020522435 A | 7/2020 |
| KR | 20110115790 A | 10/2011 |
| KR | 101404796 B1 | 6/2014 |
| KR | 101772294 B1 | 8/2017 |
| KR | 20190117417 A | 10/2019 |
| KR | 102151764 B1 | 9/2020 |

DELIVERY ROBOT CONTROL APPARATUS AND METHOD THEREOF

CROSS-REFERENCE TO RELATED APPLICATION

This application claims the benefit of and priority to Korean Patent Application No. 10-2021-0102734, filed in the Korean Intellectual Property Office on Aug. 4, 2021, the entire contents of which are incorporated herein by reference.

FIELD

The present disclosure relates to a delivery robot control apparatus and a method for controlling a delivery robot.

BACKGROUND

The statements in this section merely provide background information related to the present disclosure and may not constitute prior art.

Recently, as there has been an increase in demand for mobility capable of being used for various purposes other than existing vehicles, research for unmanned delivery robots has been actively in progress. Because an unmanned delivery robot according to an existing technology is mainly focused on delivering objects, a means about how to deliver objects at a destination is insufficient. For example, when a user exists at the destination, he or she directly withdraws and receives an object on the unmanned delivery robot according to the existing technology. On the other hand, when the user does not exist at the destination, an object is dropped on the floor from the unmanned delivery robot.

However, we have discovered that such a scheme may cause a damage problem of the object, when the object has weak durability.

SUMMARY

The present disclosure has been made to solve the above-mentioned problems occurring in the prior art while advantages achieved by the prior art are maintained intact.

An aspect of the present disclosure provides a delivery robot control apparatus for controlling a delivery robot to unload an object and a method thereof.

Another aspect of the present disclosure provides a delivery robot control apparatus for safely and automatically unloading an object upon absence of a customer and a method thereof.

Another aspect of the present disclosure provides a delivery robot control apparatus for separately delivering objects when delivering the objects to multiple destinations and a method thereof.

Another aspect of the present disclosure provides a delivery robot control apparatus for obtaining the same effect as that where a person actually delivers an object and a method thereof.

Another aspect of the present disclosure provides a delivery robot control apparatus for structurally more simply and safely delivering an object than a method using a robot arm or a method of stacking up and carrying loads and a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a delivery robot control apparatus may include a first motor provided in a delivery robot having an internal loading space having one or more floors to move a door module connected to a frame forming the internal loading space between the one or more floors and the ground, a camera provided in the delivery robot to obtain an image including the door module, and a controller that determines an upper and lower position of the door module, based on the image and controls the door module to a target position by means of the first motor, based on the determined upper and lower position of the door module.

In an embodiment, the camera may be mounted on the frame forming the internal loading space to capture the image including the door module moving in an upward and downward direction, above the door module.

In an embodiment, the controller may determine the upper and lower position of the door module based on an area or a length occupied by the door module in the image.

In an embodiment, the robot delivery control apparatus may further include a second motor that controls an internal conveyor moving an object from the internal loading space to the outside and a third motor provided in the door module to control a conveyor moving an object on the door module. The controller may detect a position of the object moving on at least one of the internal conveyor or the door module, by means of the image, and may control at least one of the second motor or the third motor, based on the detected position of the object.

In an embodiment, the controller may stop the second motor, when it is determined that the detected object deviates from the internal conveyor, based on the detected position of the object.

In an embodiment, the controller may stop the third motor, when it is determined that the detected object deviates from the internal conveyor, based on the detected position of the object, when the door module is located on the ground.

In an embodiment, the controller may stop the third motor, when it is determined that the detected object is located in the center of the door module on the door module, based on the detected position of the object, when the door module is not located on the ground.

In an embodiment, the robot delivery control apparatus may further include a second motor that controls an internal conveyor moving an object from the internal loading space to the outside, a third motor provided in the door module to control a conveyor moving an object on the door module, and at least one of a second ultrasonic sensor or a second infrared sensor provided in the delivery robot to sense a position of the object moving on at least one of the internal conveyor or the door module. The controller may control at least one of the second motor or the third motor, based on the sensed position of the object.

In an embodiment, the robot delivery control apparatus may further include a fourth motor provided at one side of the frame forming the internal loading space to rotate the door module in a direction towards the internal loading space or a direction distant from the internal loading space. The controller may control the fourth motor, based on a revolution per minute (RPM) of the fourth motor.

According to another aspect of the present disclosure, a delivery robot control apparatus may include a first motor provided in a delivery robot having an internal loading space having one or more floors to move a door module connected to a frame forming the internal loading space between the one or more floors and the ground, a sensor device including a motor sensor provided in the delivery robot to measure an RPM of the first motor and a first ultrasonic sensor or a first infrared sensor configured to sense an upper and lower position of the door module, and a controller that controls the door module to a target position by means of the first motor, based on an upper and lower position of the door module, the upper and lower position being determined by means of the RPM of the first motor, and an upper and lower position of the door module, the upper and lower position being sensed by means of at least one of the first ultrasonic sensor or the first infrared sensor.

In an embodiment, the robot delivery control apparatus may further include a second motor that controls an internal conveyor moving an object from the internal loading space to the outside, a third motor provided in the door module to control a conveyor moving an object on the door module, and at least one of a second ultrasonic sensor or a second infrared sensor provided in the delivery robot to sense a position of the object moving on at least one of the internal conveyor or the door module. The controller may control at least one of the second motor or the third motor, based on the sensed position of the object.

In an embodiment, the controller may stop the second motor, when it is determined that the sensed object deviates from the internal conveyor, based on the sensed position of the object.

In an embodiment, the controller may stop the third motor, when it is determined that the sensed object deviates from the internal conveyor, based on the sensed position of the object, when the door module is located on the ground.

In an embodiment, the controller may stop the third motor, when it is determined that the sensed object is located in the center of the door module on the door module, based on the sensed position of the object, when the door module is not located on the ground.

According to another aspect of the present disclosure, a delivery robot control method may include obtaining, by a camera provided in a delivery robot having an internal loading space having one or more floors, an image including a door module provided in the delivery robot to be connected to a frame forming the internal loading space, determining, by a controller, an upper and lower position of the door module, based on the image, and controlling the door module to a target position by means of the first motor, based on the determined upper and lower position of the door module.

In an embodiment, the determining of the upper and lower position of the door module by the controller may include determining, by the controller, the upper and lower position of the door module, based on an area or a length occupied by the door module in the image.

In an embodiment, the robot delivery control method may further include detecting, by the controller, a position of an object moving on at least one of an internal conveyor which is controlled by a second motor to move an object from the internal loading space to the outside or a conveyor which is controlled by a third motor to move an object on the door module; and controlling, by the controller, at least one of the second motor or the third motor, based on the detected position of the object.

In an embodiment, the controlling of the at least one of the second motor or the third motor by the controller may include stopping, by the controller, the second motor, when it is determined that the detected object deviates from the internal conveyor, based on the detected position of the object.

In an embodiment, the controlling of the at least one of the second motor or the third motor by the controller may include stopping the third motor, when it is determined that the detected object deviates from the door module, based on the detected position of the object, when the door module is located on the ground.

In an embodiment, the controlling of the at least one of the second motor or the third motor by the controller may include stopping the third motor, when it is determined that the detected object is located in the center of the door module on the door module, based on the detected position of the object, when the door module is not located on the ground.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and advantages of the present disclosure will be more apparent from the following detailed description taken in conjunction with the accompanying drawings.

Figure 1:
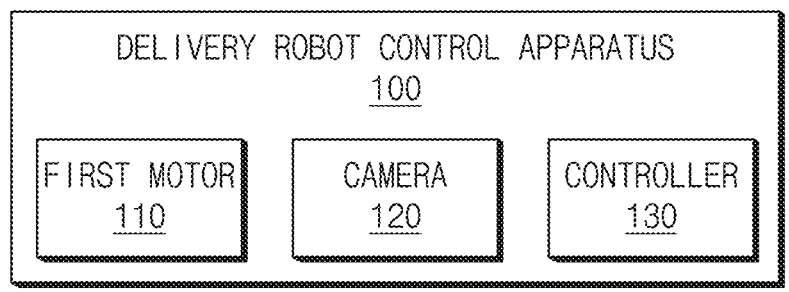
FIG. 1 is a block diagram illustrating a delivery robot control apparatus according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions are ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure are described in detail with reference to FIGS. 1 to 16.

FIG. 1 is a block diagram illustrating a delivery robot control apparatus according to an embodiment of the present disclosure.

Referring to FIG. 1, a delivery robot control apparatus 100 may include a first motor 110, a camera 120, and a controller 130.

The delivery robot control apparatus 100 according to an embodiment of the present disclosure may be implemented inside or outside a delivery robot. In this case, the delivery robot control apparatus 100 may be integrally configured with control units in the delivery robot or may be implemented as a separate hardware device to be connected with the control units of the delivery robot by a separate connection means.

As an example, the delivery robot control apparatus 100 may be integrally configured with the delivery robot or may be implemented as a separate configuration in the form of being installed/attached to the delivery robot. Alternatively, a part of the delivery robot control apparatus 100 may be integrally configured with the delivery robot or the other may be implemented as a separate configuration in the form of being installed/attached to the delivery robot.

The first motor 110 may be provided in the delivery robot having an internal loading space accommodating one or more floors to move a door module connected to a frame forming the internal loading space between the one or more floors and the ground.

As an example, the door module may move up and down by means of a movement module implemented with a double rail structure. In this case, the first motor 110 may drive the movement module implemented with the double rail structure to move the door module in an upward and downward direction.

The camera 120 may be provided in the delivery robot to obtain an image including the door module.

As an example, the camera 120 may be mounted on the frame forming the internal loading space to capture the image including the door module moving in an upward and downward direction, above the door module.

As an example, the door module may include a conveyor surface at its one side to move an object on the conveyor surface.

As an example, the camera 120 may capture an image including the conveyor surface of the door module.

When the camera 120 captures an image including the conveyor surface with a wide area in the door module, because a change in area for the conveyor surface according to the movement of the door module in the upward and downward direction increases, the controller 130 may more accurately determine an upper and lower position of the door module.

The controller 130 may perform the overall control such that respective components may normally perform their own functions. Such a controller 130 may be implemented in the form of hardware, may be implemented in the form of software, or may be implemented in the form of a combination thereof. In one form, the controller 130 may be implemented as, but not limited to, a microprocessor. In addition, the controller 130 may perform a variety of data processing, calculation, and the like described below.

The controller 130 may determine a position of the door module, based on the obtained image.

As an example, the controller 130 may determine a height-direction position (e.g., upper, middle and/or lower positions) of the door module based on an area or a length occupied by the door module in the image.

For example, as the door module moves in an upward direction or a downward direction, a distance between the camera 120, which captures the image, and the door module may be changed.

As an example, when the door module moves up, a distance from the camera 120 located at an upper side of the door module may get shorter, and an area or a length occupied by the door module in the image of the camera 120 may increase.

On the other hand, when the door module moves down, the distance from the camera 120 located at the upper side of the door module may get longer, and the area or the length occupied by the door module in the image of the camera 120 may decrease.

By means of such a principle, the controller 130 may calculate height, corresponding to an area or a length occupied by the door module in the obtained image.

The controller 130 may control the door module to a target position by means of the first motor 110, based on the determined position (e.g., upper, middle or lower position) of the door module.

As an example, to unload an object loaded on a specific floor of an internal loading space, the controller 130 may set a position to which the door module should move to the target position, by means of a set of instruction that implement an algorithm, and may control the door module to the target position, by means of the first motor 110.

Although not illustrated, the delivery robot control apparatus 100 may further include a second motor for controlling an internal conveyor which moves an object from the internal loading space to the outside and a third motor for controlling a conveyor which is provided in the door module to move an object on the door module.

As an example, the internal conveyor which moves the object from the internal loading space to the outside may be provided in each of one or more floors.

As an example, the controller 130 may detect a position of the object which moves on at least one of the internal conveyor or the door module, by means of the obtained image.

The object may be moved by means of the internal conveyor and/or a conveyor provided in the door module in at least one of the following process: a process of moving while in contact with only the internal conveyor, a process of moving while in contact with the internal conveyor and the conveyor provided in the door module at the same time, a process of deviating from the internal conveyor and moving while in contact with only the conveyor provided in the door module, and a process of deviating from the door module.

As an example, based on the position of the object determined by means of the obtained image, the controller 130 may determine which process of moving the object is performed. For example, the controller 130 may determine: whether the moving object moves while in contact with only the internal conveyor, whether the moving object moves while in contact with the internal conveyor and the conveyor provided in the door module at the same time, whether the moving object deviates from the internal conveyor and moves while in contact with only the conveyor provided in the door module, or whether the moving object deviates from the door module.

As an example, the controller 130 may control at least one of the second motor or the third motor based on the detected position of the object.

As an example, the controller 130 may control at least one of the second motor or the third motor, based on the determined process of moving the object among the above-discussed processes, for example, whether the object determined based on the detected position of the object moves while in contact with only the internal conveyor, moves while in contact with the internal conveyor and the conveyor provided in the door module at the same time, deviates from the internal conveyor and moves while in contact with only the conveyor provided in the door module, or moves deviates from the door module.

As an example, when it is determined that the detected object deviates from the internal conveyor, based on the position of the detected object, the controller 130 may stop the second motor.

When the object deviates from the internal conveyor, although the second motor stops and the internal conveyor stops, the object may move by means of an operation of the conveyor provided in the door module.

As an example, when the door module is located on the ground and when it is determined that the detected object deviates from the door module, based on the position of the detected object, the controller 130 may stop the third motor.

When the door module is located on the ground, the conveyor of the door module may operate to safely unload the object on the ground. When the object deviates from the door module, because there is a situation where the object is unloaded on the ground, there is no need to drive the third motor, which drives the conveyor of the door module, any longer.

As an example, when the door module is not located on the ground and when it is determined that the detected object is located in the center of the door module on the door module, based on the position of the detected object, the controller 130 may stop the third motor.

When the door module is not located on the ground, the conveyor of the door module may operate to take an object out of the internal loading space on the door module. When it is determined that the object is located in the center of the door module on the door module and when there may be a situation capable of safely moving the object in an upward and downward direction, there is no need to drive the third motor, which drives the conveyor of the door module, any longer.

Although not illustrated, the delivery robot control apparatus 100 may further include at least one of a second ultrasonic sensor or a second infrared sensor, which is provided in the delivery robot to sense a position of an object which moves on at least one of the internal conveyor or the door module.

As an example, the controller 130 may control at least one of the second motor or the third motor based on the sensed position of the object.

As an example, based on the position of the object, which is sensed by means of at least one of the second ultrasonic sensor or the second infrared sensor, the controller 130 may determine whether the moving object moves while in contact with only the internal conveyor, moves while in contact with the internal conveyor and the conveyor provided in the door module at the same time, deviates from the internal conveyor and moves while in contact with only the conveyor provided in the door module, or deviates from the door module.

As an example, the controller 130 may control at least one of the second motor or the third motor, based on the position of the object, which is sensed by means of at least one of the second ultrasonic sensor or the second infrared sensor, to be the same as contents of controlling at least one of the second motor or the third motor, based on the position of the object, which is determined by means of the obtained image.

Although not illustrated, the delivery robot control apparatus 100 may further include a fourth motor which is provided at one side of the frame forming the internal loading space to rotate the door module in a direction towards the internal loading space or in a direction distant from the internal loading space.

As an example, the door module may be a configuration of opening and closing the internal loading space with respect to the outside, depending on rotation by the fourth motor. As an example, the door module may be rotatably provided in the upward and downward direction.

As an example, the door module may be provided such that one side is rotatable with respect to the movement module in state where it is fixed, by the fourth motor.

As an example, the controller 130 may control the fourth motor based on a revolution per minute (RPM) of the fourth motor.

As an example, the controller 130 may calculate a degree to which the door module is opened or closed, based on the RPM of the fourth motor, and may control the fourth motor, such that the door module is fully opened or closed, depending on the calculated degree.

Figure 2:
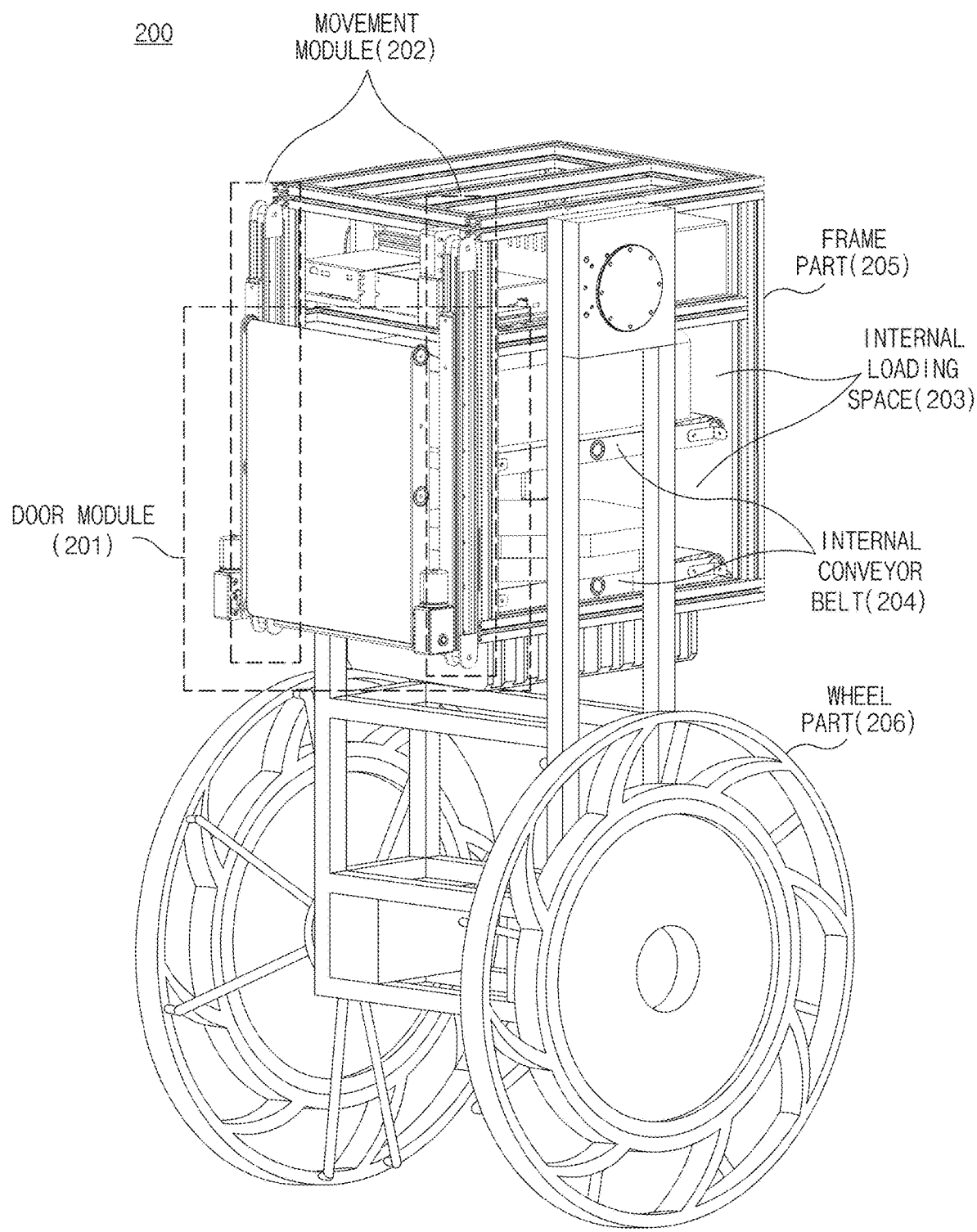
FIG. 2 is a drawing illustrating a shape of a delivery robot according to another embodiment of the present disclosure.

FIG. 2 is a drawing illustrating a shape of a delivery robot according to another embodiment of the present disclosure.

Referring to FIG. 2, a delivery robot 200 may include a door module 201, a movement module 202, and an internal conveyor belt 204.

As an example, the delivery robot 200 may include a frame part 205 forming an internal loading space 203.

As an example, the frame part 205 may form the internal loading space 203 of one or more floors in an upward and downward direction.

As an example, the delivery robot 200 may be coupled to one side of the frame part 205, and may include a wheel part 206 including at least one wheel. As an example, the wheel part 206 may be coupled to a lower side of the frame part 205.

As an example, the delivery robot 200 may further include the movement module 202 which is coupled to the other side of the frame part 205 and is provided movable with respect to the frame part 205.

As an example, a portion of the movement module 202 may be fixed and coupled to the frame part 205, and another portion of the movement module 202 may be provided movable in an upward and downward direction with respect to the frame part 205. As an example, the movement module 202 may be coupled to the front of the frame part 205.

As an example, the internal conveyor belt 204 may be provided at a lower end of each of the internal loading spaces 203 making up one or floors to operate by a motor.

As an example, the internal conveyor belt 204 may operate to move an object placed thereon in a forward and backward direction of the delivery robot 200.

Figure 3:
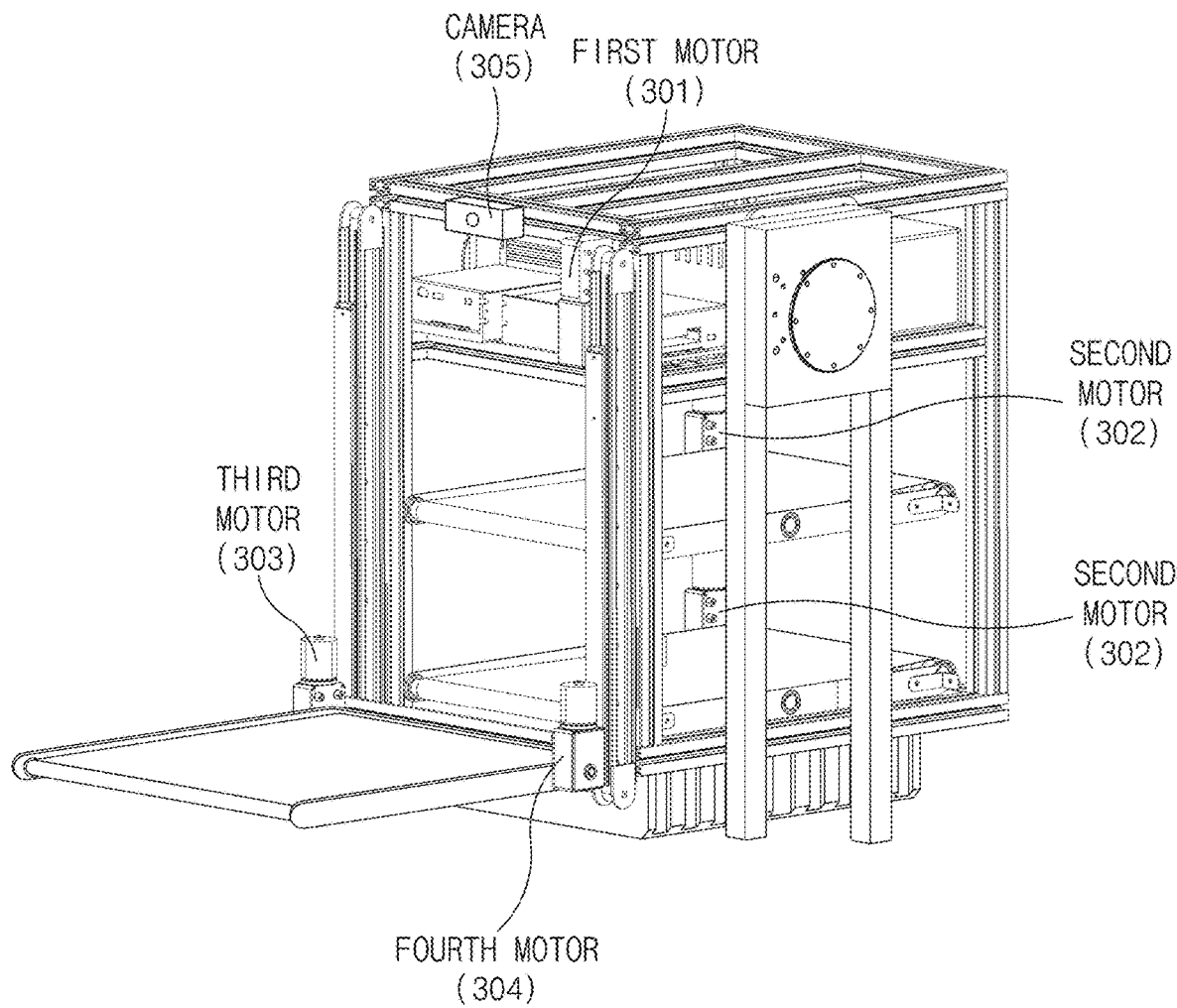
FIG. 3 is a drawing illustrating motors and a camera of a delivery robot control apparatus according to an embodiment of the present disclosure.

FIG. 3 is a drawing illustrating motors and a camera of a delivery robot control apparatus according to an embodiment of the present disclosure.

As an example, a delivery robot control apparatus 100 of FIG. 1 may include a first motor 301, a second motor 302, a third motor 303, a fourth motor 304, and a camera 305.

The first motor 301 may be provided in a movement module to move a door module in an upward and downward direction.

As an example, the first motor 301 may move the door module to a target position corresponding to a specific floor of an internal loading space or a ground position.

The second motor 302 may be provided in an internal conveyor and may move the internal conveyor to move an object placed on the internal conveyor.

The third motor 303 may be provided in the door module and may move a conveyor of the door module to move an object placed on the door module.

The fourth motor 304 may be provided in the door module and may rotate the door module in a direction towards the internal loading space or a direction distant from the internal loading space, in a state where one side of the door module is fixed.

The camera 305 may be provided at an upper side than the door module and may capture an image including the door module in a downward direction from the top.

As an example, the camera 305 may have a frame forming the internal loading space.

Particularly, the camera 305 may be provided on an upper end of the frame at the door module side of the frame forming the internal loading space.

Figure 4:
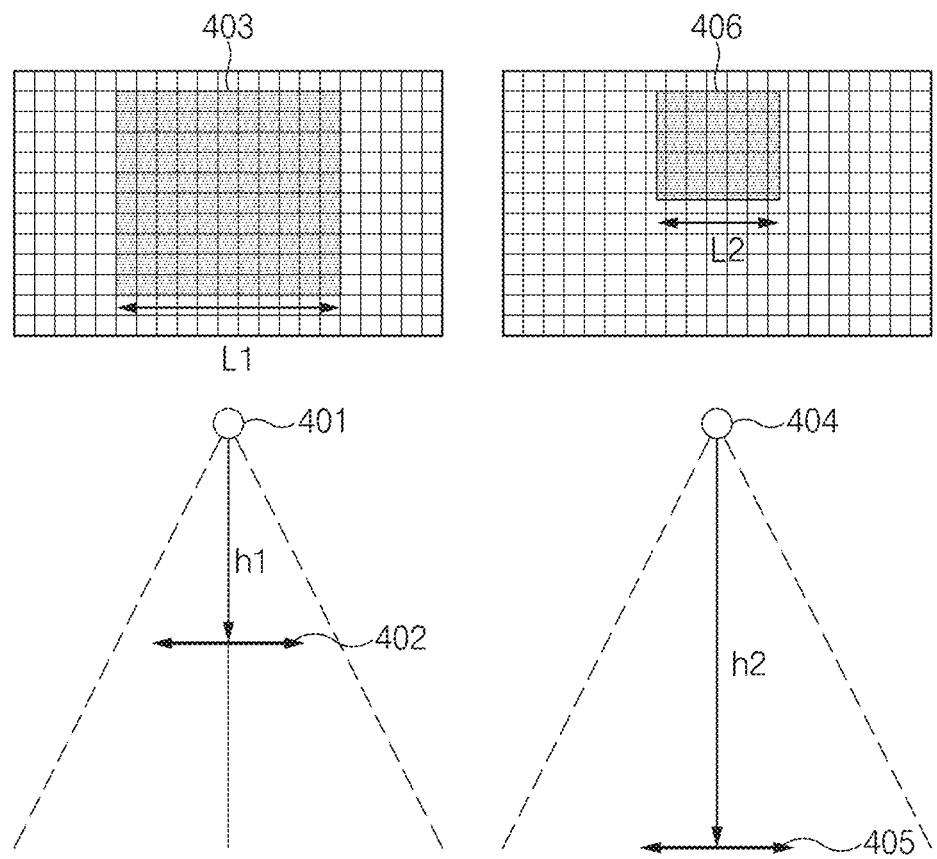
FIG. 4 is a drawing illustrating that a delivery robot control apparatus determines an upper and lower position of a door module based on an image according to an embodiment of the present disclosure.

FIG. 4 is a drawing illustrating that a delivery robot control apparatus determines an upper and lower position of a door module based on an image according to an embodiment of the present disclosure.

Referring to FIG. 4, a camera 401 or 404 may capture an image including a door module 402 or 405 in a downward direction from the top.

A delivery robot control apparatus 100 of FIG. 1 may calculate a distance from the camera 401 or 404 to the door module 402 or 405, based on an area 403 or 406 or a length occupied by the door module 402 or 405 in the image including the door module 402 or 405, which is obtained by means of the camera 401 or 404. The delivery robot control apparatus 100 may determine an upper and lower position of the door module 402 or 405 based on the calculated distance from the camera 401 or 404 to the door module 402 or 405.

As an example, the delivery robot control apparatus 100 may determine the area 403 406 or the length occupied by the door module 402 or 405 in the image, by means of the number of pixels occupied by the door module 402 or 405 in the image including the door module 402 or 405, which is obtained by means of the camera 401 or 404.

Particularly, the delivery robot control apparatus 100 may calculate the number of pixels occupied by a length of one side of the door module 402 or 405 in the image including the door module 402 or 405, which is obtained by means of the camera 401 or 404.

As an example, when the number of the pixels occupied by the length of the one side of the door module 402 is L1, the delivery robot control apparatus 100 may receive and store information indicating that the distance from the camera 401 to the door module 402 is h1.

Furthermore, when the number of the pixels occupied by the length of the one side of the door module 405 is L2, the delivery robot control apparatus 100 may receive and store information indicating that the distance from the camera 404 to the door module 405 is h2.

In this case, because the number of the pixels occupied by the length of the one side of the door module and the distance from the camera to the door module have a linear relationship, the delivery robot control apparatus 100 may calculate the distance from the camera to the door module, corresponding to the number of the pixels occupied by the length of the one side of the door module, by means of linear interpolation.

For the area, the number of pixels occupied by the area of the door module may be proportional to the square of the distance from the camera to the door module.

Thus, as another example, the delivery robot control apparatus 100 may calculate the distance from the camera to the door module, corresponding to the number of the pixels occupied by the area of the door module.

Figure 5A:
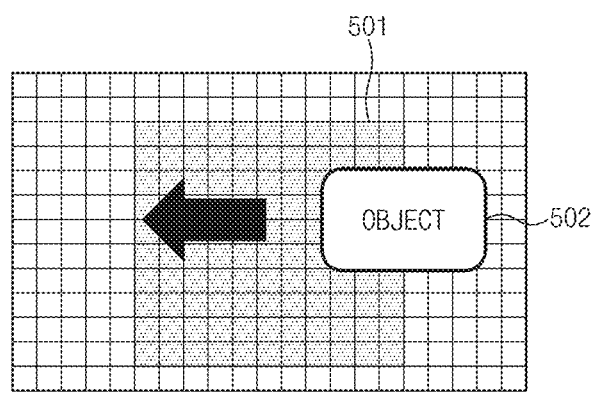
FIGS. 5A, 5B and 5C are drawings illustrating that a delivery robot control apparatus detects an object on a door module according to an embodiment of the present disclosure.
Figure 5B:
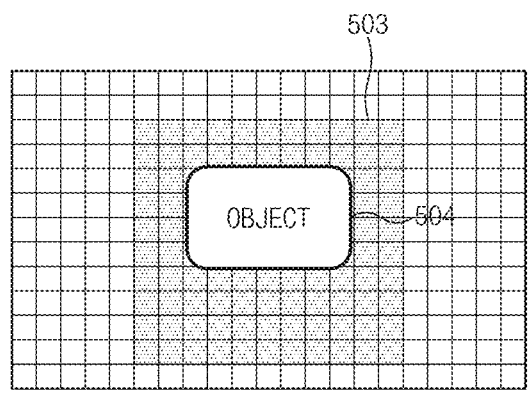
Figure 5C:
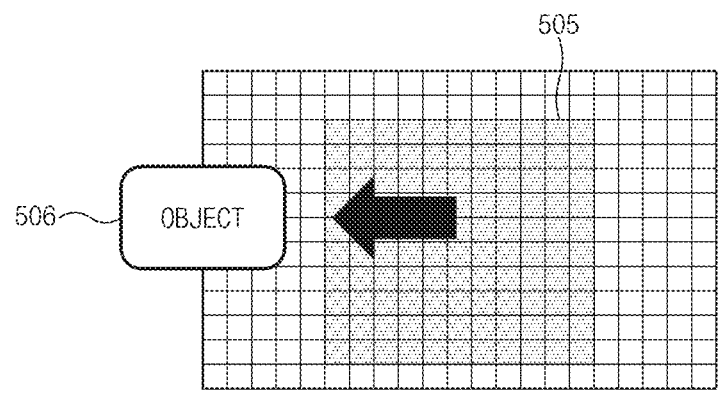

FIGS. 5A, 5B and 5C are drawings illustrating that a delivery robot control apparatus detects an object on a door module according to an embodiment of the present disclosure.

Referring to FIGS. 5A-5C, an object 502, 504, or 506 may move in a left direction from the right of a door module 501, 503, or 505.

A delivery robot control apparatus 100 of FIG. 1 may detect a position of the object 502, 504, or 506 from an image captured by means of a camera 120 of FIG. 1.

In FIG. 5A, when detecting that a portion where the object 502 is overlapped with a door module 501 in the image appears, the delivery robot control apparatus 100 may determine that the object 502 is withdrawn from an internal loading space and enters the door module 501.

In this case, the delivery robot control apparatus 100 may operate a conveyor of the door module 501 such that the object 502 is located in the center of the door module 501.

In FIG. 5B, when a left and right position of the center of the object 504 is identical to a left and right position of the center of the door module 503 in the image, the delivery robot control apparatus 100 may determine whether the object 504 is located in the center of the door module 503.

In this case, when the object 504 is located in the center of the door module 503, the delivery robot control apparatus 100 may stop the conveyor of the door module 503.

In FIG. 5C, when detecting that the portion where the object 506 is overlapped with the door module 505 disappears in the image, the delivery robot control apparatus 100 may determine that the object 506 deviates from the door module 505.

In this case, the delivery robot control apparatus 100 may determine that the unloading of the object 506 is completed to stop the conveyor of the door module 505.

Figure 6:
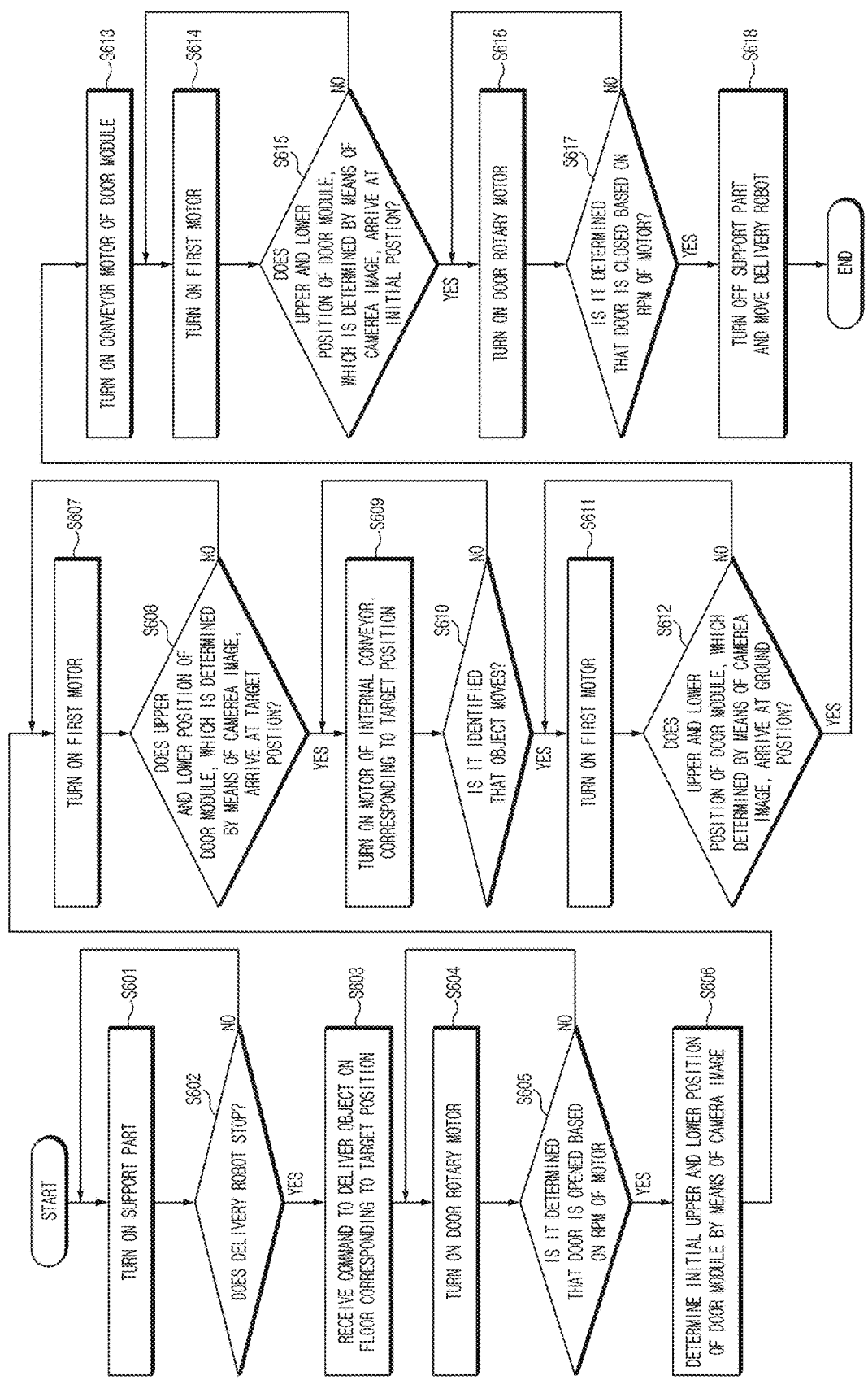
FIG. 6 is a flowchart illustrating a process where a delivery robot control apparatus controls a delivery robot based on a camera image according to an embodiment of the present disclosure.

FIG. 6 is a flowchart illustrating a process where a delivery robot control apparatus controls a delivery robot based on a camera image according to an embodiment of the present disclosure.

Referring to FIG. 6, in S601, a delivery robot control apparatus 100 of FIG. 1 may turn on a support part of a delivery robot.

As an example, when the delivery robot arrives at a delivery destination, the delivery robot control apparatus 100 may turn on the support part of the delivery robot to unload an object being a delivery target and may fix the delivery robot to the ground.

After turning on the support part of the delivery robot in S601, in S602, the delivery robot control apparatus 100 may identify whether the delivery robot stops.

As an example, the delivery robot control apparatus 100 may identify whether the delivery robot is fixed to the ground by the support part to stop.

After identifying whether the delivery robot stops in S602, when it is identified that the delivery robot does not stop, the delivery robot control apparatus 100 may return to S601 to turn on the support part of the delivery robot.

After identifying whether the delivery robot stops in S602, when it is identified that the delivery robot stops, in S603, the delivery robot control apparatus 100 may receive a command to delivery an object on a floor corresponding to the target position.

As an example, the delivery robot control apparatus 100 may receive information about a floor of an internal loading space loaded with an object to be unloaded and a command to unload the object.

As an example, the delivery robot control apparatus 100 may receive a command to delivery an object on the floor corresponding to the target position, through internal delivery robot communication from a memory, which is provided in the delivery robot, in which a delivery algorithm is previously stored.

After receiving the command to deliver the object on the floor corresponding to the target position in S603, in S604, the delivery robot control apparatus 100 may turn on a door rotary motor.

As an example, the delivery robot control apparatus 100 may turn on a fourth motor, which rotates a door module, in the direction of opening the door module.

After turning on the door rotary motor in S604, in S605, the delivery robot control apparatus 100 may identify whether it is determined that the door is opened based on an RPM of the motor.

As an example, the delivery robot control apparatus 100 may identify whether it is determined that the door is opened, based on the RPM of the fourth motor arrives at an RPM corresponding to a state where the door module is fully opened.

After identifying whether it is determined that the door is opened based on the RPM of the motor in S605, when it is not determined that the door is opened, the delivery robot control apparatus 100 may return to S604 to turn on the door rotary motor.

After identifying whether it is determined that the door is opened based on the RPM of the motor in S605, when it is determined that the door is opened, in S606, the delivery robot control apparatus 100 may determine an initial upper and lower position of the door module by means of a camera image.

As an example, the delivery robot control apparatus 100 may determine the initial upper and lower position of the door module, based on an area or a length occupied by the door module at the initial position in the camera image.

After determining the initial upper and lower position of the door module by means of the camera image in S606, in S607, the delivery robot control apparatus 100 may turn on a first motor.

As an example, the delivery robot control apparatus 100 may turn on the first motor to move the door module to the target position.

The process in S607 is described in detail below with reference to FIG. 15.

After turning on the door rotary motor in S607, in S608, the delivery robot control apparatus 100 may identify whether the upper and lower position of the door module, which is determined by means of the camera image, arrives at the target position.

As an example, the delivery robot control apparatus 100 may identify whether the upper and lower position of the door module arrives at the target position, based on the area or the length occupied by the door module in the camera image arrives at an area or a length of the door module, corresponding to the target position.

After identifying whether the upper and lower position, which is determined by means of the camera image, arrives at the target position in S608, when it is identified that the upper and lower position of the door module does not arrive at the target position, the delivery robot control apparatus 100 may return to S607 to turn on the first motor.

After identifying whether the upper and lower position of the door module, which is determined by means of the camera image, arrives at the target position in S608, when it is identified that the upper and lower position of the door module arrives at the target position, in S609, the delivery robot control apparatus 100 may turn on a motor of an internal conveyor, corresponding to the target position.

As an example, the delivery robot control apparatus 100 may turn on the motor of the internal conveyor to withdraw an object from the internal loading space.

After turning on the motor of the internal conveyor, corresponding to the target position, in S609, in S610, the delivery robot control apparatus 100 may identify whether the object moves.

The process in S609 and S610 is described in detail below with reference to FIG. 7.

After identifying the object moves in S610, when it is identified that the object does not move, the delivery robot control apparatus 100 may return to S609 to turn on the motor of the internal conveyor corresponding to the target position.

After identifying the object moves in S610, when it is identified that the object moves, in S611, the delivery robot control apparatus 100 may turn on the first motor.

The process in S611 is described in detail below with reference to FIG. 15.

After turning on the first motor in S611, in S612, the delivery robot control apparatus 100 may identify whether the upper and lower position of the door module, which is determined by means of the camera image, arrives at a ground position.

As an example, the delivery robot control apparatus 100 may identify whether the upper and lower position of the door module arrives at the ground position, based on the area or the length occupied by the door module in the camera image arrives at an area or a length of the door module, corresponding to the ground position.

After identifying whether the upper and lower position of the door module, which is determined by means of the camera image, arrives at the ground position in S612, when it is identified that the upper and lower position of the door module, which is determined by means of the camera image, does not arrive at the ground position, the delivery robot control apparatus 100 may return to S611 to turn on the first motor.

After identifying whether the upper and lower position of the door module, which is determined by means of the camera image, arrives at the ground position in S612, when it is identified that the upper and lower position of the door module, which is determined by means of the camera image, arrives at the ground position, in S613, the delivery robot control apparatus 100 may turn on a conveyor motor of the door module.

The process in S613 is described in detail below with reference to FIG. 9.

After turning on the conveyor motor of the door module in S613, in S614, the delivery robot control apparatus 100 may turn on the first motor.

The process in S614 is described in detail below with reference to FIG. 15.

After turning on the first motor in S614, in S615, the delivery robot control apparatus 100 may identify whether the upper and lower position of the door module, which is determined by means of the camera image, arrives at an initial position.

As an example, the delivery robot control apparatus 100 may identify whether the upper and lower position of the door module arrives at the initial position, based on the area or the length occupied by the door module in the camera image arrives at an area or a length of the door module, corresponding to the initial position.

After identifying whether the upper and lower position of the door module, which is determined by means of the camera image, arrives at the initial position in S615, when it is identified that the upper and lower position of the door module does not arrive at the initial position, the delivery robot control apparatus 100 may return to S614 to turn on the first motor.

After identifying whether the upper and lower position of the door module, which is determined by means of the camera image, arrives at the initial position in S615, when it is identified that the upper and lower position of the door module arrives at the initial position, in S616, the delivery robot control apparatus 100 may turn on the door rotary motor.

As an example, the delivery robot control apparatus 100 may turn on the fourth motor which rotates the door module in the direction of closing the door module.

After turning on the door rotary motor in S616, in S617, the delivery robot control apparatus 100 may identify whether it is determined that the door is closed based on an RPM of the motor.

As an example, the delivery robot control apparatus 100 may identify whether it is determined that the door is closed, based on whether the RPM of the fourth motor arrives at an RPM corresponding to a state where the door module is fully closed.

After identifying whether it is determined that the door is closed based on the RPM of the motor in S617, when it is not determined that the door is closed, the delivery robot control apparatus 100 may return to S616 to turn on the door rotary motor.

After identifying whether it is determined that the door is closed based on the RPM of the motor in S617, when it is determined that the door is closed, in S618, the delivery robot control apparatus 100 may turn off the support part and move the delivery robot.

Figure 7:
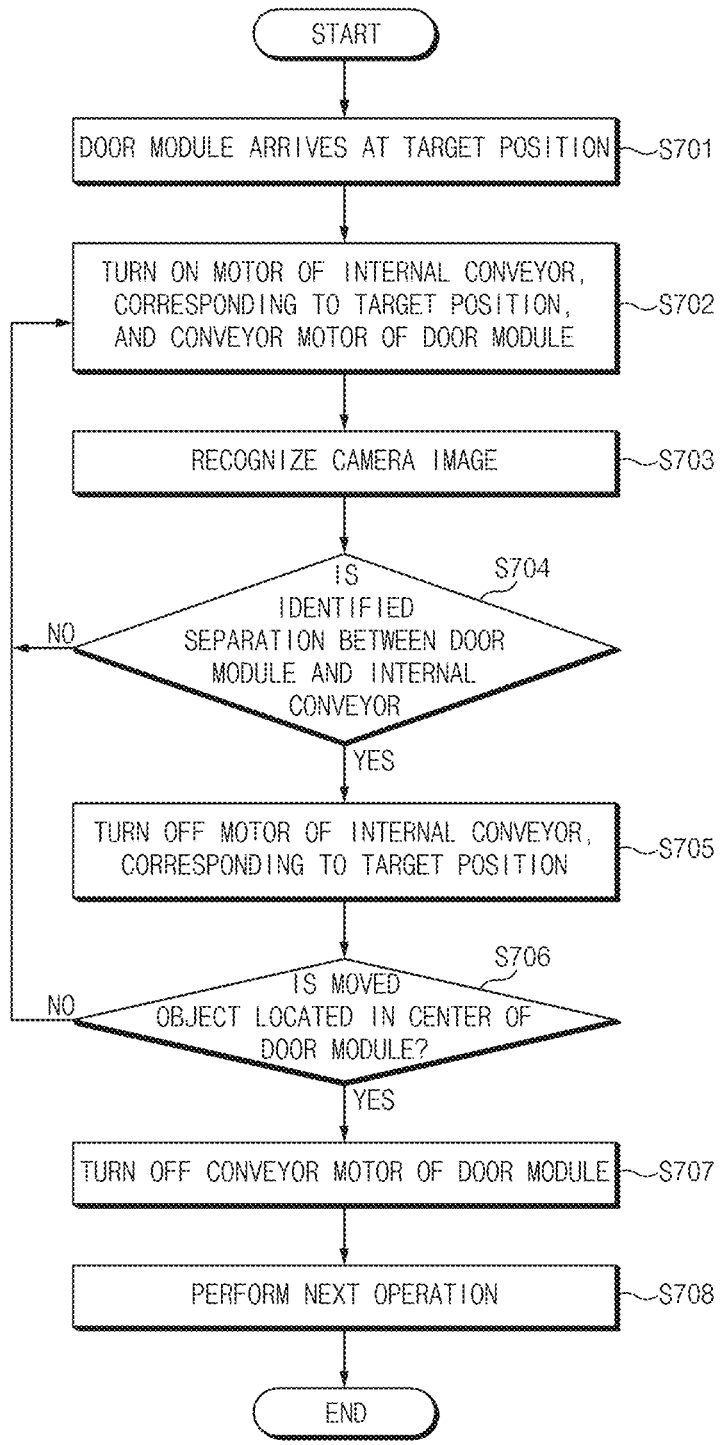
FIG. 7 is a flowchart illustrating a process where a delivery robot control apparatus moves an object from an internal loading space to a door module according to an embodiment of the present disclosure.

FIG. 7 is a flowchart illustrating a process where a delivery robot control apparatus moves an object from an internal loading space to a door module according to an embodiment of the present disclosure.

Referring to FIG. 7, in S701, a delivery robot control apparatus 100 of FIG. 1 may identify whether a door module arrives at a target position.

As an example, the delivery robot control apparatus 100 may identify whether an upper and lower position of the door module arrives at the target position, based on an area or a length occupied by the door module in a camera image arrives at an area or a length of the door module, corresponding to the target position.

After identifying that the door module arrives at the target position in S701, in S702, the delivery robot control apparatus 100 may turn on a motor of an internal conveyor, corresponding to the target position and a conveyor motor of the door module.

As an example, the delivery robot control apparatus 100 may turn on the motor of the internal conveyor and the conveyor motor of the door module to withdraw an object from the internal loading space onto the door module.

After turning on the motor of the internal conveyor, corresponding to the target position, and the conveyor motor of the door module in S702, in S703, the delivery robot control apparatus 100 may recognize the camera image.

After recognizing the camera image in S703, in S704, the delivery robot control apparatus 100 may identify whether a separation space is recognized between the door module and the internal conveyor.

While an object on the separation space between the door module and the internal conveyor is withdrawn from the internal loading space onto the door module, it may fail to be recognized by being hidden by a moving object. When the object is fully withdrawn from the internal loading space onto the door module, the separation space may be recognized.

A description is given in detail below of the separation space with reference to FIG. 8.

After identifying whether the separation space is recognized between the door module and the internal conveyor in S704, when it is identified that the separation space is not recognized between the door module and the internal conveyor, the delivery robot control apparatus 100 may return to S702 to turn on the motor of the internal conveyor, corresponding to the target position, and the conveyor motor of the door module.

After identifying whether the separation space is recognized between the door module and the internal conveyor in S704, when it is identified that the separation space is not recognized between the door module and the internal conveyor, in S705, the delivery robot control apparatus 100 may turn off the motor of the internal conveyor, corresponding to the target position.

When the object is fully withdrawn from the internal loading space onto the door module, because the internal conveyor does not need to operate any longer, the delivery robot control apparatus 100 may turn off the motor of the internal conveyor, corresponding to the target position, when it is identified that the separation space is recognized between the door module and the internal conveyor.

After turning off the motor of the internal conveyor, corresponding to the target position, in S705, in S706, the delivery robot control apparatus 100 may identify whether the moved object is located in the center of the door module.

After identifying whether the moved object is located in the center of the door module in S706, when it is identified that the moved object is not located in the center of the door module, the delivery robot control apparatus 100 may return to S702 to turn on the motor of the internal conveyor, corresponding to the target position, and the conveyor motor of the door module.

After identifying whether the moved object is located in the center of the door module in S706, when it is identified that the moved object is located in the center of the door module, in S707, the delivery robot control apparatus 100 may turn off the conveyor motor of the door module.

When the object is located in the center of the door module, because the conveyor motor of the door module does not need to operate any longer, the delivery robot control apparatus 100 may turn off the conveyor motor of the door module, when it is identified that the object is located in the center of the door module.

After turning off the conveyor motor of the door module in S707, in S708, the delivery robot control apparatus 100 may perform a next operation.

As an example, the delivery robot control apparatus 100 may perform an operation in S611 of FIG. 6.

Figure 8:
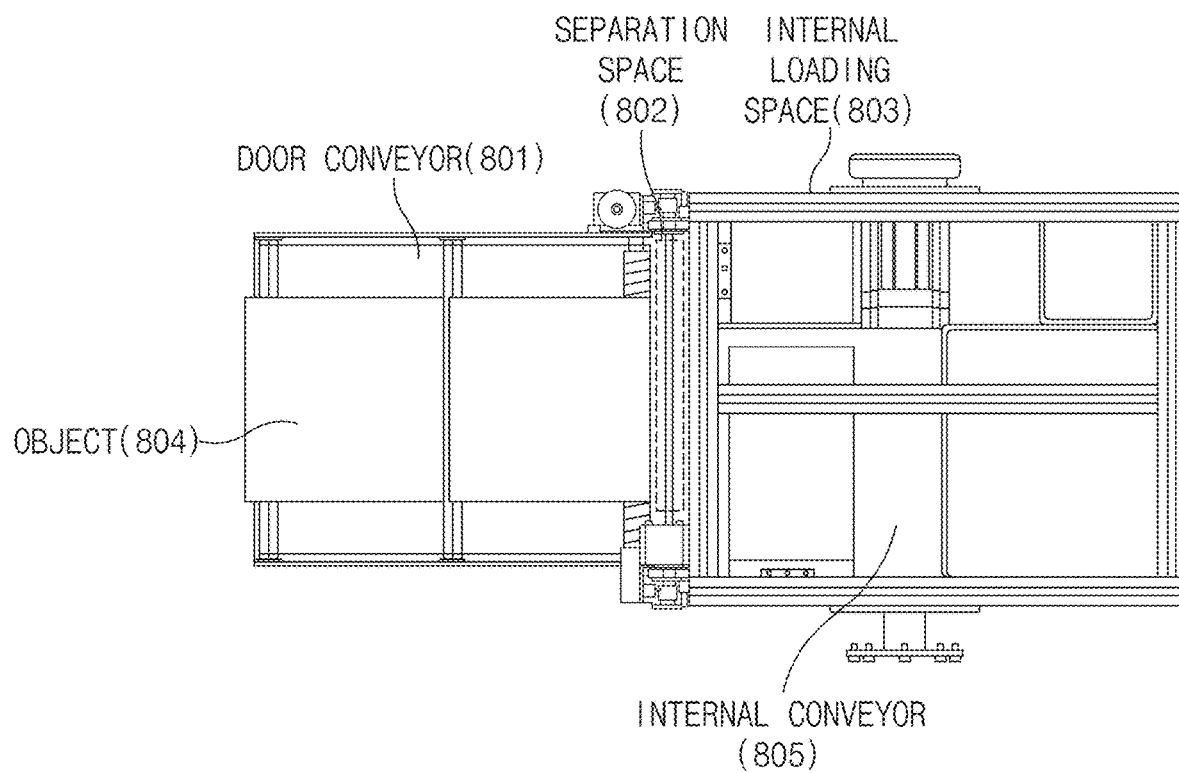
FIG. 8 is a drawing illustrating that a delivery robot control apparatus moves an object from an internal loading space to a door module according to an embodiment of the present disclosure.

FIG. 8 is a drawing illustrating that a delivery robot control apparatus moves an object from an internal loading space to a door module according to an embodiment of the present disclosure.

An object 804 may be withdrawn from an internal loading space 803 onto a door conveyor 801 by an operation of an internal conveyor 805 and the door conveyor 801.

FIG. 8 is a drawing illustrating viewing a process where the object 804 is withdrawn from the internal loading space 803 onto the door conveyor 801 from the top to the bottom, which is similar to point of view of a camera 120 of FIG. 1.

In the process where the object 804 is withdrawn from the internal loading space 803 onto the door conveyor 801, when the object 804 moves while in contact with both the internal conveyor 805 and the door conveyor 801, a separation space 802 may fail to be recognized from an image obtained by means of the camera 120.

When the object 804 deviates from the internal conveyor 805 to be in contact with only the door conveyor 801, the separation space 802 may be recognized from the image obtained by means of the camera 120.

Thus, the delivery robot control apparatus 100 may determine whether the object 804 deviates from the internal conveyor 805, based on whether the separation space 802 is recognized from the image obtained by means of the camera 120.

Figure 9:
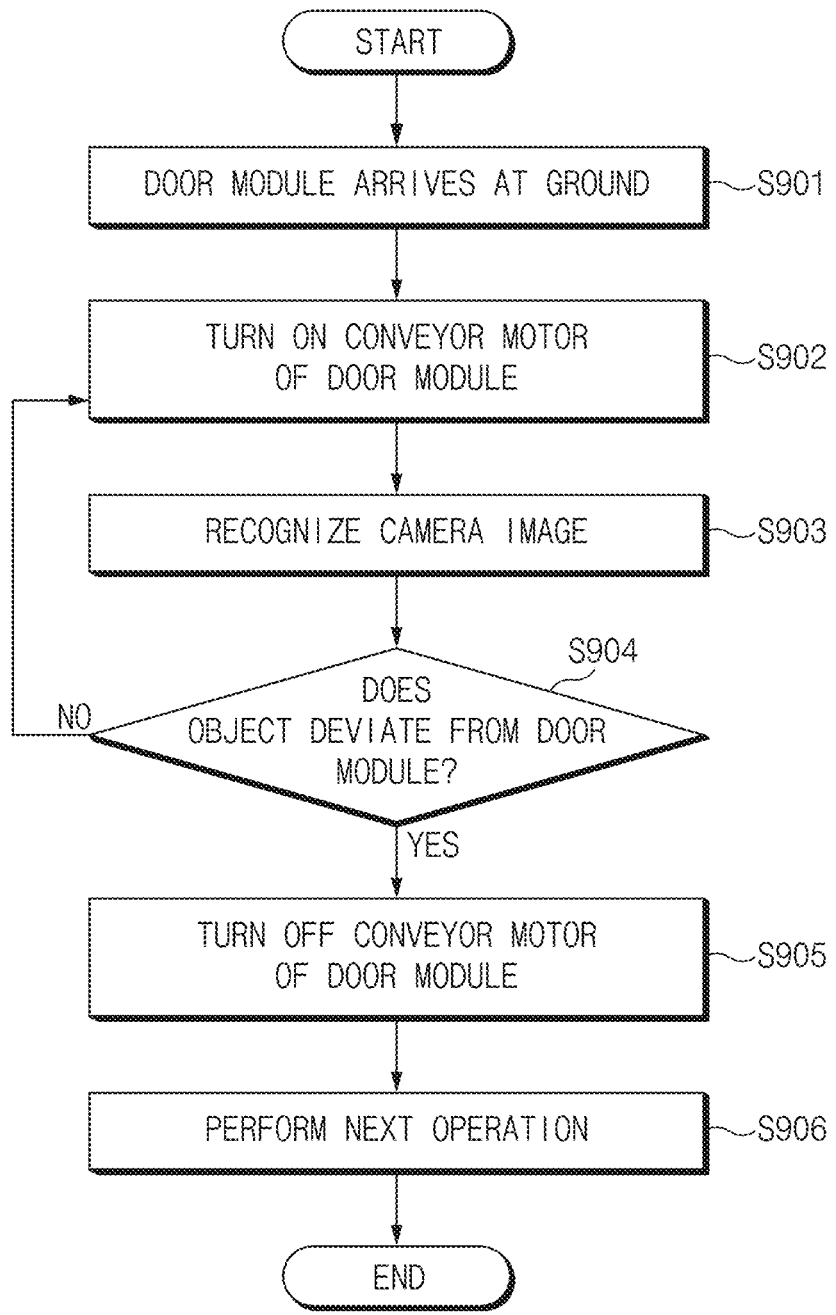
FIG. 9 is a flowchart illustrating that a delivery robot control apparatus unloads an object from a door module to the ground according to an embodiment of the present disclosure.

FIG. 9 is a flowchart illustrating that a delivery robot control apparatus unloads an object from a door module to the ground according to an embodiment of the present disclosure.

Referring to FIG. 9, in S901, a delivery robot control apparatus 100 may identify whether a door module arrives at a ground position.

As an example, the delivery robot control apparatus 100 may identify whether an upper and lower position of the door module arrives at the ground position, based on an area or a length occupied by the door module in a camera image arrives at an area or a length of the door module, corresponding to the ground position.

After identifying that the door module arrives at the ground position in S901, in S902, the delivery robot control apparatus 100 may turn on a conveyor motor of the door module.

As an example, the delivery robot control apparatus 100 may turn on the conveyor motor of the door module to unload an object from the door module to the ground.

After turning on the conveyor motor of the door module in S902, in S903, the delivery robot control apparatus 100 may recognize the camera image.

After recognizing the camera image in S903, in S904, the delivery robot control apparatus 100 may identify whether the object deviates from the door module.

As an example, when a portion where the object and the door module are overlapped with each other disappears from the camera image, the delivery robot control apparatus 100 may identify that the object deviates from the door module.

After identifying whether the object deviates from the door module in S904, when it is identified that the object does not deviate from the door module, the delivery robot control apparatus 100 may return to S902 to turn on the conveyor motor of the door module.

After identifying whether object deviates from the door module in S904, when it is identified that the object deviates from the door module, in S905, the delivery robot control apparatus 100 may turn off the conveyor motor of the door module.

When the object is fully unloaded from the door module to the ground, because the conveyor motor of the door module does not need to operate any longer, the delivery robot control apparatus 100 may turn off the conveyor motor of the door module, when it is identified that the object deviates from the door module.

After turning off the conveyor motor of the door module in S905, in S906, the delivery robot control apparatus 100 may perform a next operation.

As an example, the delivery robot control apparatus 100 may perform an operation in S614 of FIG. 6.

Figure 10:
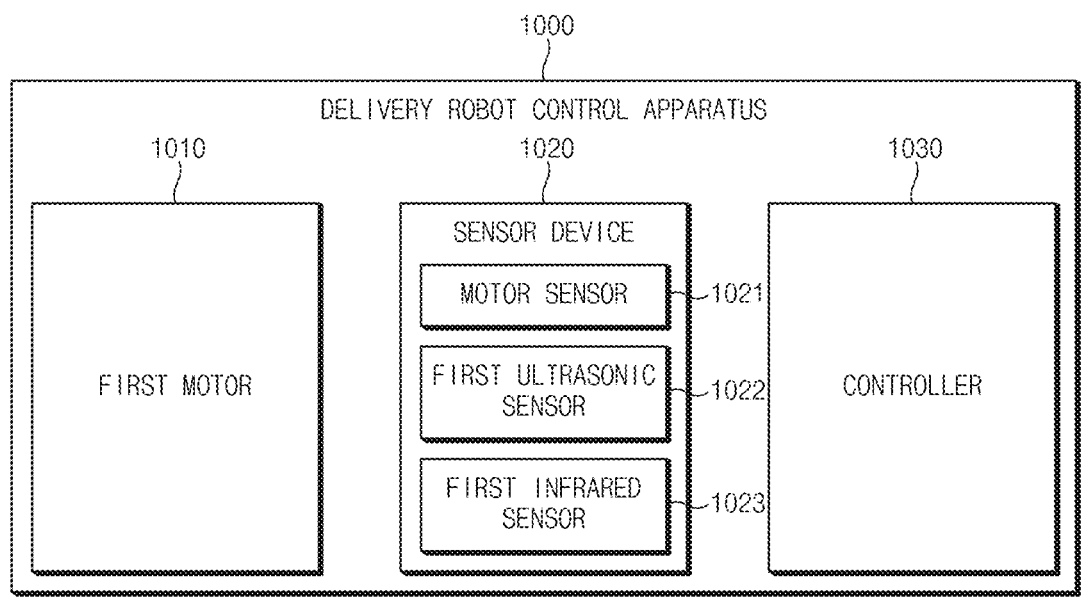
FIG. 10 is a block diagram illustrating a delivery robot control apparatus according to another embodiment of the present disclosure.

FIG. 10 is a block diagram illustrating a delivery robot control apparatus according to another embodiment of the present disclosure.

Referring to FIG. 10, a delivery robot control apparatus 1000 may include a first motor 1010, a sensor device 1020, and a controller 1030.

The first motor 1010 may be the same as a first motor 110 of FIG. 1 and may include all of the above-mentioned features of the first motor 110.

The sensor device 1020 may include a motor sensor 1021, a first ultrasonic sensor 1022, or a first infrared sensor 1023.

The motor sensor 1021 may measure an RPM of the first motor 1010.

As an example, the motor sensor 1021 may be provided in the first motor 1010 to measure an RPM of the first motor 1010 and may transmit information about the measured RPM to the controller 1030.

The first ultrasonic sensor 1022 or the first infrared sensor 1023 may sense an upper and lower position of a door module As an example, the first ultrasonic sensor 1022 may transmit an ultrasonic wave and may measure a distance to the door module using the ultrasonic wave reflected from the door module.

As an example, the first infrared sensor 1023 may transmit an infrared ray and may measure a distance to the door module using the infrared ray reflected from the door module.

As an example, the first ultrasonic sensor 1022 or the first infrared sensor 1023 may transmit a position of the door module, which is determined by means of the measured distance to the door module, to the controller 1030.

The controller 1030 may control the door module to a target position by means of the first motor 1010, based on the position of the door module, which is determined by means of the RPM of the first motor 1010, and the upper and lower position of the door module, which is sensed by means of at least one of the first ultrasonic sensor 1022 or the first infrared sensor 1023.

As an example, to unload an object loaded on a specific floor of an internal loading space, the controller 1030 may set a position to which the door module should move to the target position, by means of a predetermined algorithm, and may control the door module to the target position, by means of the first motor 1010.

Although not illustrated, the delivery robot control apparatus 1000 may further include a second motor for controlling an internal conveyor which moves an object from the internal loading space to the outside and a third motor for controlling a conveyor which is provided in the door module to move an object on the door module.

As an example, the internal conveyor which moves the object from the internal loading space to the outside may be provided in each of one or more floors.

Furthermore, although not illustrated, the delivery robot control apparatus 1000 may further include at least one of a second ultrasonic sensor or a second infrared sensor, which is provided in a delivery robot to sense a position of an object which moves on at least one of the internal conveyor or the door module.

As an example, the controller 1030 may control at least one of the second motor or the third motor based on the sensed position of the object.

As an example, when it is determined that the sensed object deviates from the internal conveyor, based on the sensed position of the object, the controller 1030 may stop the second motor.

As an example, when the door module is located on the ground and when it is determined that the sensed object deviates from the door module, based on the sensed position of the object, the controller 1030 may stop the third motor.

As an example, when the door module is not located on the ground and when it is determined that the detected object is located in the center of the door module on the door module based on the sensed position of the object, the controller 1030 may stop the third motor.

Figure 11:
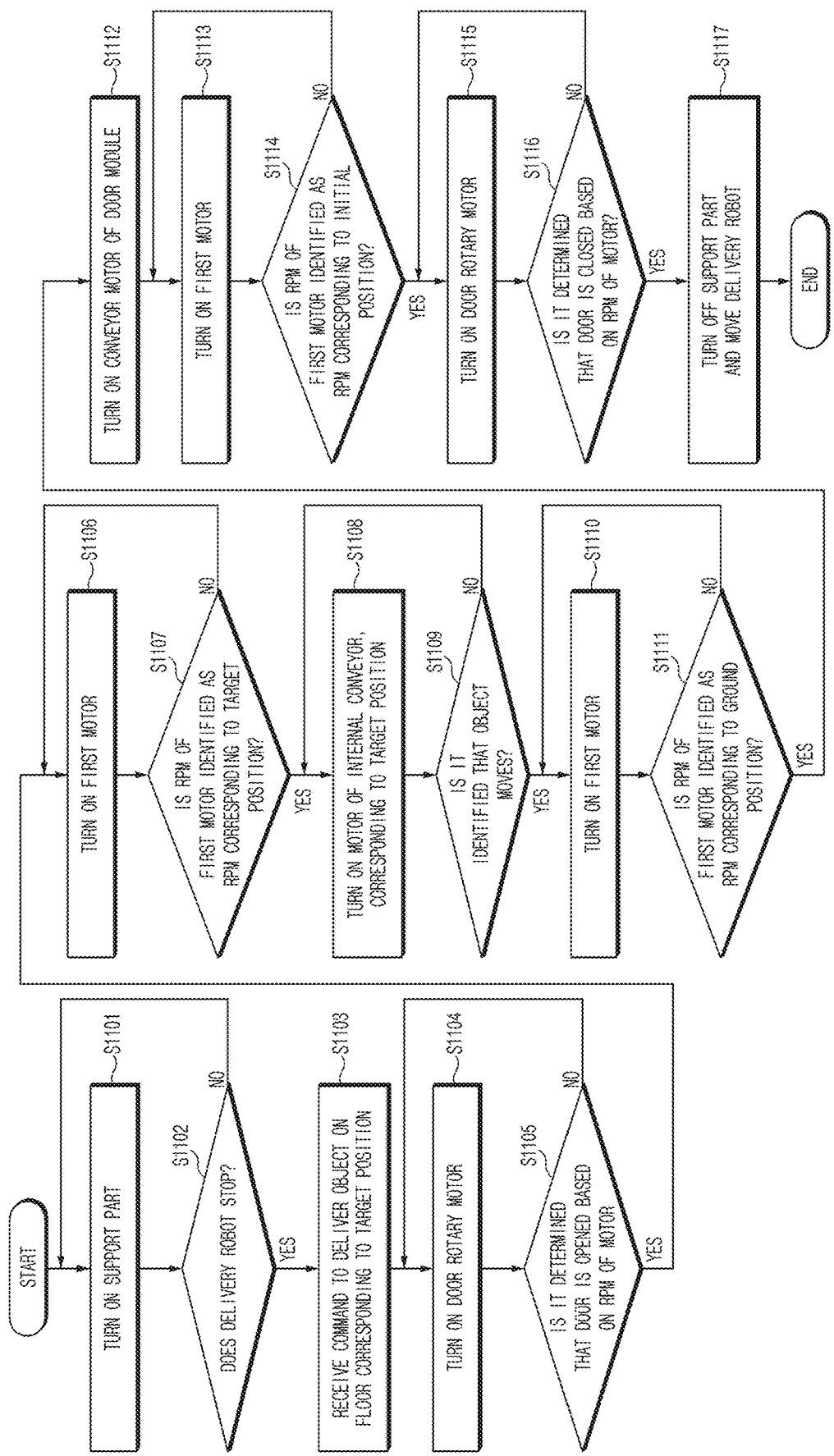
FIG. 11 is a flowchart illustrating a process where a delivery robot control apparatus controls a delivery robot based on a motor RPM according to an embodiment of the present disclosure.

FIG. 11 is a flowchart illustrating a process where a delivery robot control apparatus controls a delivery robot based on a motor RPM according to an embodiment of the present disclosure.

Referring to FIG. 11, in S1101, a delivery robot control apparatus 100 or 1000 of FIG. 1 or 10 may turn on a support part of a delivery robot.

After turning on the support part of the delivery robot in S1101, in S1102, the delivery robot control apparatus 100 or 1000 may identify whether the delivery robot stops.

After identifying whether the delivery robot stops in S1102, when it is identified that the delivery robot does not stop, the delivery robot control apparatus 100 or 1000 may return to S1101 to turn on the support part of the delivery robot.

After identifying whether the delivery robot stops in S1102, when it is identified that the delivery robot stops, in S1103, the delivery robot control apparatus 100 or 1000 may receive a command to delivery an object on a floor corresponding to a target position.

After receiving the command to deliver the object on the floor corresponding to the target position in S1103, in S1104, the delivery robot control apparatus 100 or 1000 may turn on a door rotary motor.

After turning on the door rotary motor in S1104, in S1105, the delivery robot control apparatus 100 or 1000 may identify whether it is determined that the door is opened based on an RPM of the motor.

Because the process in S1101 to S1105 is the same as a process in S601 to S605 of FIG. 6, a detailed description thereof is omitted.

After identifying whether it is determined that the door is opened based on the RPM of the motor in S1105, when it is not determined that the door is opened, the delivery robot control apparatus 100 or 1000 may return to S1104 to turn on the door rotary motor.

After identifying whether it is determined that the door is opened based on the RPM of the motor in S1105, when it is determined that the door is opened, in S1106, the delivery robot control apparatus 100 or 1000 may turn on a first motor.

Because the process in S1106 is the same as a process in S607 of FIG. 6, a detailed description thereof is omitted.

After turning on the first motor in S1106, in S1107, the delivery robot control apparatus 100 or 1000 may identify whether the RPM of the first motor arrives at an RPM corresponding to the target position.

As an example, the delivery robot control apparatus 100 or 1000 may identify whether the door module arrives at the target position, based on whether the RPM of the first motor arrives at the RPM corresponding to the target position.

After identifying whether identifying whether the RPM of the first motor arrives at the RPM corresponding to the target position in S1107, when it is identified that the RPM of the first motor does not arrive at the RPM corresponding to the target position, the delivery robot control apparatus 100 or 1000 may return to S1106 to turn on the first motor.

After identifying whether identifying whether the RPM of the first motor arrives at the RPM corresponding to the target position in S1107, when it is identified that the RPM of the first motor arrives at the RPM corresponding to the target position, the delivery robot control apparatus 100 or 1000 may turn on a motor of an internal conveyor, corresponding to the target position.

After turning on the motor of the internal conveyor, corresponding to the target position, in S1108, in S1109, the delivery robot control apparatus 100 or 1000 may identify whether the object moves.

After identifying the object moves in S1109, when it is identified that the object does not move, the delivery robot control apparatus 100 or 1000 may return to S1108 to turn on the motor of the internal conveyor, corresponding to the target position.

After identifying the object moves in S1109, when it is identified that the object moves, in S1110, the delivery robot control apparatus 100 or 1000 may turn on the first motor.

Because the process in S1108 to S1110 is the same as a process in S609 to S611 of FIG. 6, a detailed description thereof is omitted.

After turning on the first motor in S1110, in S1111, the delivery robot control apparatus 100 or 1000 may identify whether the RPM of the first motor arrives at an RPM corresponding to a ground position.

As an example, the delivery robot control apparatus 100 or 1000 may identify whether the door module arrives at the ground position, based on whether the RPM of the first motor arrives at the RPM corresponding to the ground position.

After identifying whether identifying whether the RPM of the first motor arrives at the RPM corresponding to the ground position in S1111, when it is identified that the RPM of the first motor does not arrive at the RPM corresponding to the ground position, the delivery robot control apparatus 100 or 1000 may return to S1110 to turn on the first motor.

After identifying whether identifying whether the RPM of the first motor arrives at the RPM corresponding to the ground position in S1111, when it is identified that the RPM of the first motor arrives at the RPM corresponding to the ground position, in S1112, the delivery robot control apparatus 100 or 1000 may turn on a conveyor motor of the door module.

After turning on the conveyor motor of the door module in S1112, in S1113, the delivery robot control apparatus 100 or 1000 may turn on the first motor.

Because the process in S1112 and S1113 is the same as a process in S613 and S614 of FIG. 6, a detailed description thereof is omitted.

After turning on the first motor in S1113, in S1114, the delivery robot control apparatus 100 or 1000 may identify whether the RPM of the first motor arrives at an RPM corresponding to an initial position.

As an example, the delivery robot control apparatus 100 or 1000 may identify whether the door module arrives at the initial position, based on whether the RPM of the first motor arrives at the RPM corresponding to the initial position.

After identifying whether the RPM of the first motor arrives at the RPM corresponding to the initial position in S1114, when it is identified that the RPM of the first motor does not arrive at the RPM corresponding to the initial position, the delivery robot control apparatus 100 or 1000 may return to S1113 to turn on the first motor.

After identifying whether the RPM of the first motor arrives at the RPM corresponding to the initial position in S1114, when it is identified that the RPM of the first motor arrives at the RPM corresponding to the initial position, the delivery robot control apparatus 100 or 1000 may turn on the door rotary motor.

After turning on the door rotary motor in S1115, in S1116, the delivery robot control apparatus 100 or 1000 may identify whether it is determined that the door is closed based on an RPM of the motor.

After identifying whether it is determined that the door is closed based on the RPM of the motor in S1116, when it is not determined that the door is closed, the delivery robot control apparatus 100 or 1000 may return to S1115 to turn on the door rotary motor.

After identifying whether it is determined that the door is closed based on the RPM of the motor in S1116, when it is determined that the door is closed, in S1117, the delivery robot control apparatus 100 or 1000 may turn off the support part and move the delivery robot.

Because the process in S1115 to S1117 is the same as a process in S616 to S618 of FIG. 6, a detailed description thereof is omitted.

Figure 12:
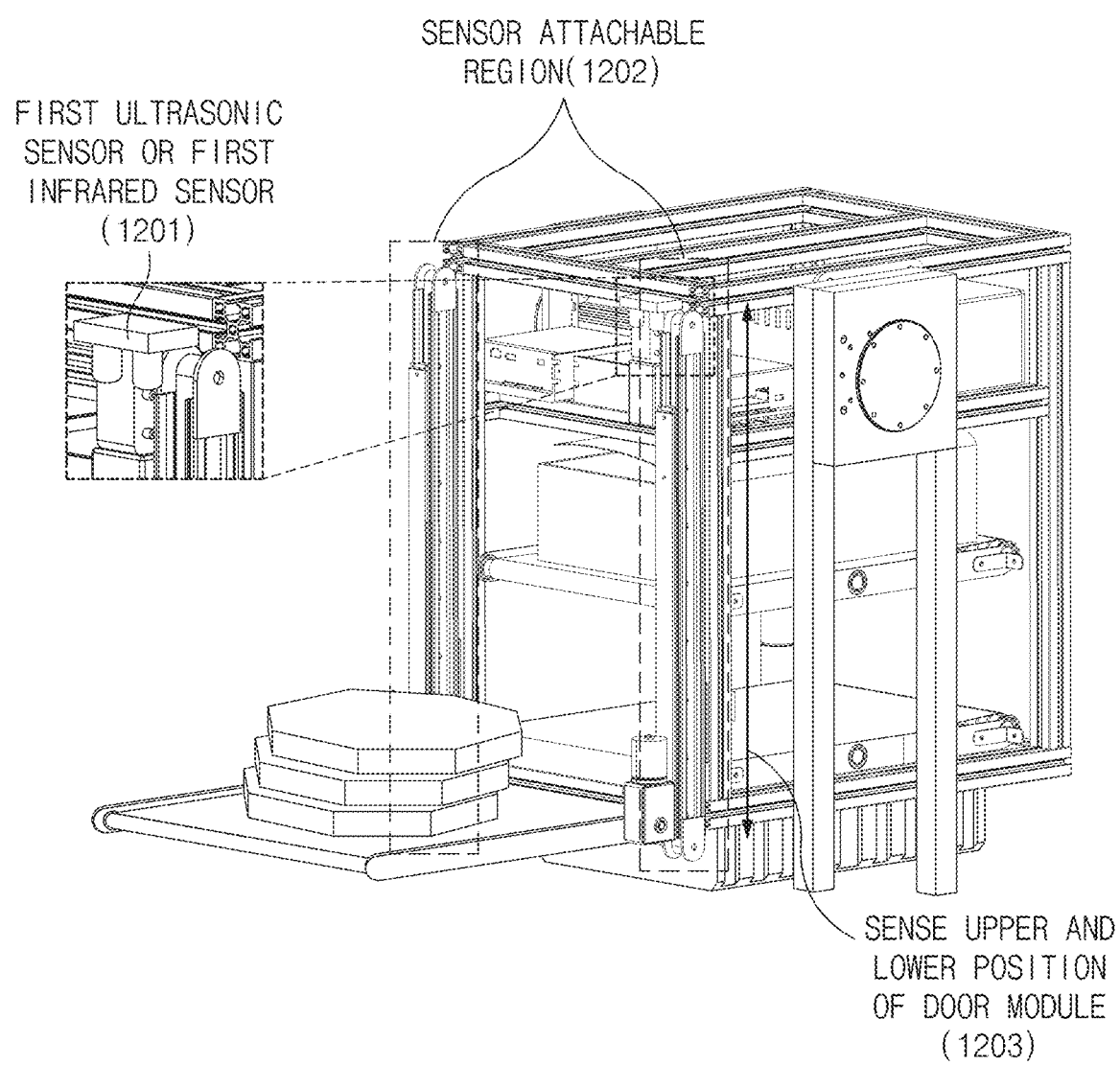
FIG. 12 is a drawing illustrating that an ultrasonic sensor or an infrared sensor provided in a delivery robot control apparatus according to an embodiment of the present disclosure.

FIG. 12 is a drawing illustrating that an ultrasonic sensor or an infrared sensor provided in a delivery robot control apparatus according to an embodiment of the present disclosure.

Referring to FIG. 12, a first ultrasonic sensor or first infrared sensor 1201 may be provided by being coupled to an upper end of a movement module coupled to one side of a frame forming an internal loading space.

As an example, the first ultrasonic sensor or first infrared sensor 1201 may be provided at the upper end of the movement module to output an ultrasonic wave or an infrared ray in a downward direction from the top.

Although it is not a portion shown, the first ultrasonic sensor or first infrared sensor 1201 may be provided by being attached to a random position on a sensor attachable region 1202.

The first ultrasonic sensor or the first infrared sensor 1201 may output an ultrasonic wave or an infrared ray.

The first ultrasonic sensor or first infrared sensor 1201 may measure a distance between the first ultrasonic sensor or first infrared sensor 1201 and the door module, based on a time taken for the output ultrasonic wave or infrared ray to be reflected from the door module and return to the first ultrasonic sensor or first infrared sensor 1201.

The first ultrasonic sensor or first infrared sensor 1201 may sense an upper and lower position of the door module (1203), based on the measured distance between the first ultrasonic sensor or first infrared sensor 1201 and the door module.

Figure 13:
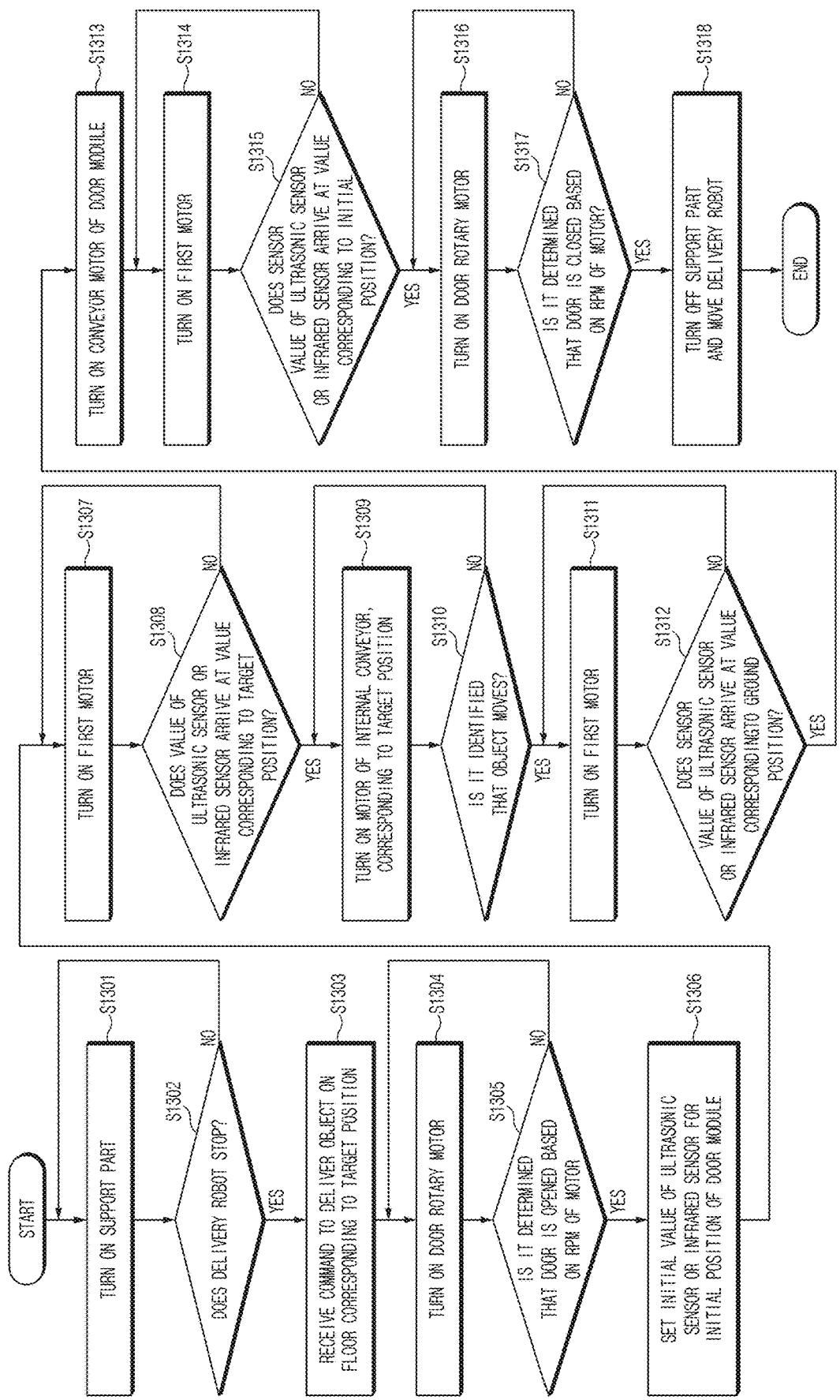
FIG. 13 is a flowchart illustrating a process where a delivery robot control apparatus controls a delivery robot based on an ultrasonic sensor or an infrared sensor according to an embodiment of the present disclosure.

FIG. 13 is a flowchart illustrating a process where a delivery robot control apparatus controls a delivery robot based on an ultrasonic sensor or an infrared sensor according to an embodiment of the present disclosure.

Referring to FIG. 13, in S1301, a delivery robot control apparatus 100 or 1000 of FIG. 1 or 10 may turn on a support part of a delivery robot.

After turning on the support part of the delivery robot in S1301, in S1302, the delivery robot control apparatus 100 or 1000 may identify whether the delivery robot stops.

After identifying whether the delivery robot stops in S1302, when it is identified that the delivery robot does not stop, the delivery robot control apparatus 100 or 1000 may return to S1301 to turn on the support part of the delivery robot.

After identifying whether the delivery robot stops in S1302, when it is identified that the delivery robot stops, in S1303, the delivery robot control apparatus 100 or 1000 may receive a command to delivery an object on a floor corresponding to a target position.

After receiving the command to deliver the object on the floor corresponding to the target position in S1303, in S1304, the delivery robot control apparatus 100 or 1000 may turn on a door rotary motor.

After turning on the door rotary motor in S1304, in S1305, the delivery robot control apparatus 100 or 1000 may identify whether it is determined that the door is opened based on an RPM of the motor.

Because the process in S1301 to S1305 is the same as a process in S601 to S605 of FIG. 6, a detailed description thereof is omitted.

After identifying whether it is determined that the door is opened based on the RPM of the motor in S1305, when it is not determined that the door is opened, the delivery robot control apparatus 100 or 1000 may return to S1304 to turn on the door rotary motor.

After identifying whether it is determined that the door is opened based on the RPM of the motor in S1305, in S1306, the delivery robot control apparatus 100 or 1000 may set an initial value of an ultrasonic sensor or an infrared sensor for an initial position of a door module.

As an example, the delivery robot control apparatus 100 or 1000 may set the initial value of the ultrasonic sensor or the infrared sensor for the initial position of the door module, based on a time taken for an ultrasonic wave or an infrared ray output through the first ultrasonic sensor or the first infrared sensor to be reflected from the door module to return.

After setting the initial value of the ultrasonic sensor or the infrared sensor for the initial position of the door module in S1306, in S1307, the delivery robot control apparatus 100 or 1000 may turn on the first motor.

Because the process in S1307 is the same as a process in S607 of FIG. 6, a detailed description thereof is omitted.

After turning on the first motor in S1307, in S1308, the delivery robot control apparatus 100 or 1000 may identify whether a sensor value of the ultrasonic sensor or the infrared sensor arrives at a value corresponding to the target position.

As an example, the delivery robot control apparatus 100 or 1000 may identify whether the door module arrives at the target position, based on whether the sensor value of the first ultrasonic sensor or the first infrared sensor arrives at the value corresponding to the target position.

After identifying whether the sensor value of the ultrasonic sensor or the infrared sensor arrives at the value corresponding to the target position in S1308, when it is identified that the sensor value of the ultrasonic sensor or the infrared sensor does not arrive at the value corresponding to the target position, the delivery robot control apparatus 100 or 1000 may return to S1307 to turn on the first motor.

After identifying whether the sensor value of the ultrasonic sensor or the infrared sensor arrives at the value corresponding to the target position in S1308, when it is identified that the sensor value of the ultrasonic sensor or the infrared sensor arrives at the value corresponding to the target position, in S1309, the delivery robot control apparatus 100 or 1000 may turn on a motor of an internal conveyor, corresponding to the target position.

After turning on the motor of the internal conveyor, corresponding to the target position, in S1309, in S1310, the delivery robot control apparatus 100 or 1000 may identify whether the object moves.

After identifying the object moves in S1310, when it is identified that the object does not move, the delivery robot control apparatus 100 or 1000 may return to S1309 to turn on the motor of the internal conveyor, corresponding to the target position.

After identifying the object moves in S1310, when it is identified that the object moves, in S1311, the delivery robot control apparatus 100 or 1000 may turn on the first motor.

Because the process in S1309 to S1311 is the same as a process in S609 to S611 of FIG. 6, a detailed description thereof is omitted.

After turning on the first motor in S1311, in S1312, the delivery robot control apparatus 100 or 1000 may identify whether the sensor value of the ultrasonic sensor or the infrared sensor arrives at a value corresponding to a ground position.

As an example, the delivery robot control apparatus 100 or 1000 may identify whether the door module arrives at the ground position, based on whether the sensor value of the first ultrasonic sensor or the first infrared sensor arrives at the value corresponding to the ground position.

After identifying whether the sensor value of the ultrasonic sensor or the infrared sensor arrives at the value corresponding to the ground position in S1312, when it is identified that the sensor value of the ultrasonic sensor or the infrared sensor does not arrive at the value corresponding to the ground position, the delivery robot control apparatus 100 or 1000 may return to S1311 to turn on the first motor.

After identifying whether the sensor value of the ultrasonic sensor or the infrared sensor arrives at the value corresponding to the ground position in S1312, when it is identified that the sensor value of the ultrasonic sensor or the infrared sensor arrives at the value corresponding to the ground position, the delivery robot control apparatus 100 or 1000 may turn on a conveyor motor of the door module.

After turning on the conveyor motor of the door module in S1313, in S1314, the delivery robot control apparatus 100 or 1000 may turn on the first motor.

Because the process in S1313 and S1314 is the same as a process in S613 and S614 of FIG. 6, a detailed description thereof is omitted.

After turning on the first motor in S1314, in S1315, the delivery robot control apparatus 100 or 1000 may identify whether the sensor value of the ultrasonic sensor or the infrared sensor arrives at a value corresponding to an initial position.

As an example, the delivery robot control apparatus 100 or 1000 may identify whether the door module arrives at the initial position, based on whether the sensor value of the first ultrasonic sensor or the first infrared sensor arrives at the value corresponding to the initial position.

After identifying whether the sensor value of the ultrasonic sensor or the infrared sensor arrives at the value corresponding to the initial position in S1315, when it is identified that the sensor value of the ultrasonic sensor or the infrared sensor does not arrive at the value corresponding to the initial position, the delivery robot control apparatus 100 or 1000 may return to S1314 to turn on the first motor.

After identifying whether the sensor value of the ultrasonic sensor or the infrared sensor arrives at the value corresponding to the initial position in S1315, when it is identified that the sensor value of the ultrasonic sensor or the infrared sensor arrives at the value corresponding to the initial position, in S1316, the delivery robot control apparatus 100 or 1000 may turn on the door rotary motor.

After turning on the door rotary motor in S1316, in S1317, the delivery robot control apparatus 100 or 1000 may identify whether it is determined that the door is closed based on an RPM of the motor.

After identifying whether it is determined that the door is closed based on the RPM of the motor in S1317, when it is not determined that the door is closed, the delivery robot control apparatus 100 or 1000 may return to S1316 to turn on the door rotary motor.

After identifying whether it is determined that the door is closed based on the RPM of the motor in S1317, when it is determined that the door is closed, in S1318, the delivery robot control apparatus 100 or 1000 may turn off the support part and move the delivery robot.

Because the process in S1316 to S1318 is the same as a process in S616 to S618 of FIG. 6, a detailed description thereof is omitted.

Figure 14:
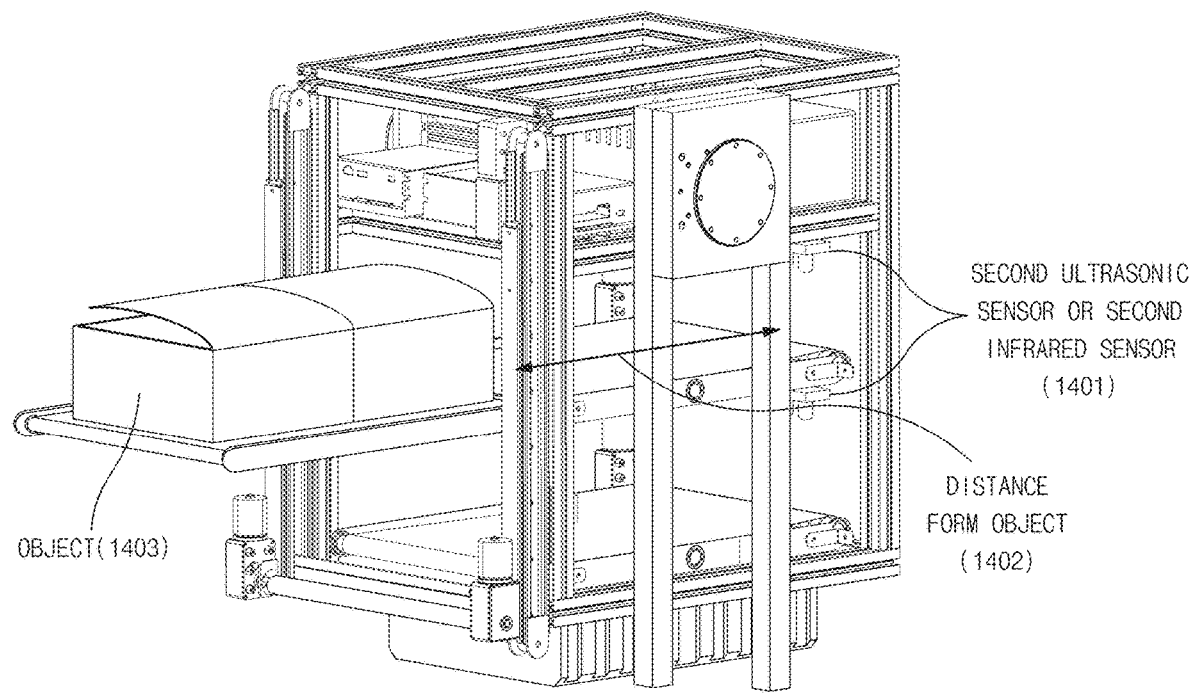
FIG. 14 is a drawing illustrating a process where a delivery robot control apparatus moves an object from an internal loading space to a door module according to an embodiment of the present disclosure.

FIG. 14 is a drawing illustrating a process where a delivery robot control apparatus moves an object from an internal loading space to a door module according to an embodiment of the present disclosure.

Referring to FIG. 14, a second ultrasonic sensor or second infrared sensor 1401 may be provided at a rear end of an internal loading space.

As an example, the second ultrasonic sensor or second infrared sensor 1401 may output an ultrasonic wave or an infrared ray.

The second ultrasonic sensor or second infrared sensor 1401 may measure a distance 1402 between the second ultrasonic sensor or second infrared sensor 1401 and an object 1403, based on a time taken for the output ultrasonic wave or infrared ray to be reflected from the object 1403 and return to the second ultrasonic sensor or second infrared sensor 1401.

The second ultrasonic sensor or second infrared sensor 1401 may sense a position in a forward and backward direction of the object 1403, based on the measured distance 1402 between the second ultrasonic sensor or second infrared sensor 1401 and the object 1043.

Figure 15:
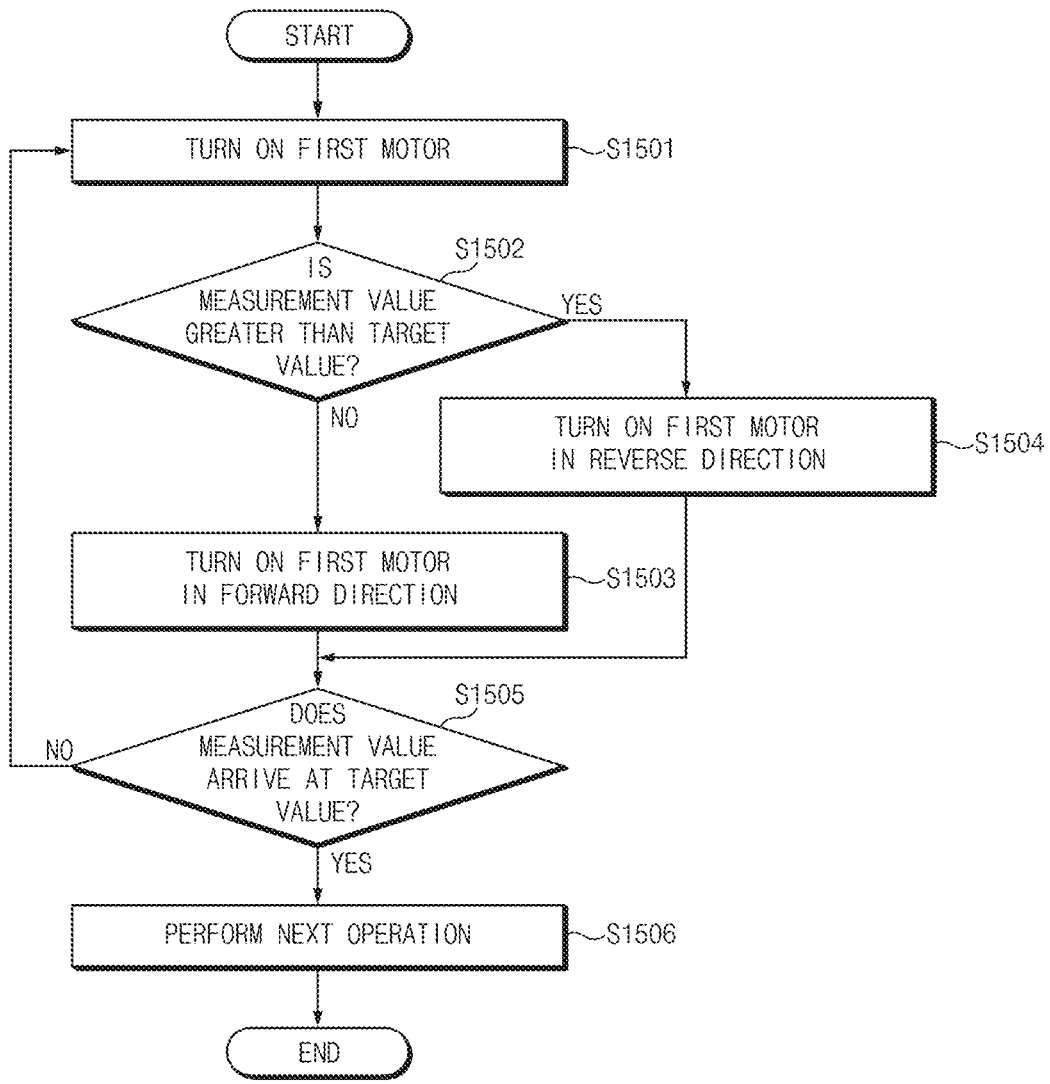
FIG. 15 is a flowchart illustrating that a delivery robot control apparatus moves a door module to a target position according to an embodiment of the present disclosure.

FIG. 15 is a flowchart illustrating that a delivery robot control apparatus moves a door module to a target position according to an embodiment of the present disclosure.

Referring to FIG. 15, in S1501, a delivery robot control apparatus 100 or 1000 of FIG. 1 or 10 may turn on a first motor.

After turning on the first motor in S1501, in S1502, the delivery robot control apparatus 100 or 1000 may identify whether a measurement value is greater than a target value.

As an example, the measurement value may include the number of pixels corresponding to a length or an area occupied by a door module in a camera image, an RPM of a first motor (when a direction in which the door module descends is a direction in which the RPM increases), or a time taken for an infrared ray or an ultrasonic wave output from an infrared sensor or an ultrasonic sensor to be reflected from the door module to return.

As an example, the target value may include the number of pixels, an RPM, or a time, which corresponds to a target position, a ground position, or an initial position.

After identifying whether the measurement value is greater than the target value in S1502, when it is identified that the measurement value is not greater than the target value, in S1503, the delivery robot control apparatus 100 or 1000 may turn on the first motor in a forward rotation.

Herein, the direction in which the door module descends may correspond to the forward rotation of the first motor.

After turning on the first motor in the forward rotation in S1503, in S1505, the delivery robot control apparatus 100 or 1000 may identify whether the measurement value arrives at the target value.

After identifying whether the measurement value is greater than the target value in S1502, when it is identified that the measurement value is greater than the target value, in S1504, the delivery robot control apparatus 100 or 1000 may turn on the first motor in a reverse direction.

Herein, the direction in which the door module rises may correspond to the reverse rotation of the first motor.

After turning on the first motor in the reverse rotation in S1504, in S1505, the delivery robot control apparatus 100 or 1000 may identify whether the measurement value arrives at the target value.

After identifying whether the measurement value arrives at the target value in S1505, when it is identified that the measurement value does not arrive at the target value, the delivery robot control apparatus 100 or 1000 may return to S1501 to turn on the first motor.

After identifying whether the measurement value arrives at the target value in S1505, when it is identified that the measurement value arrives at the target value, in S1506, the delivery robot control apparatus 100 or 1000 may perform a next operation.

As an example, the delivery robot control apparatus 100 or 1000 may perform the process in S608, S612, S615, S1107, S1111, S1114, S1308, S1312, or S1315.

Figure 16:
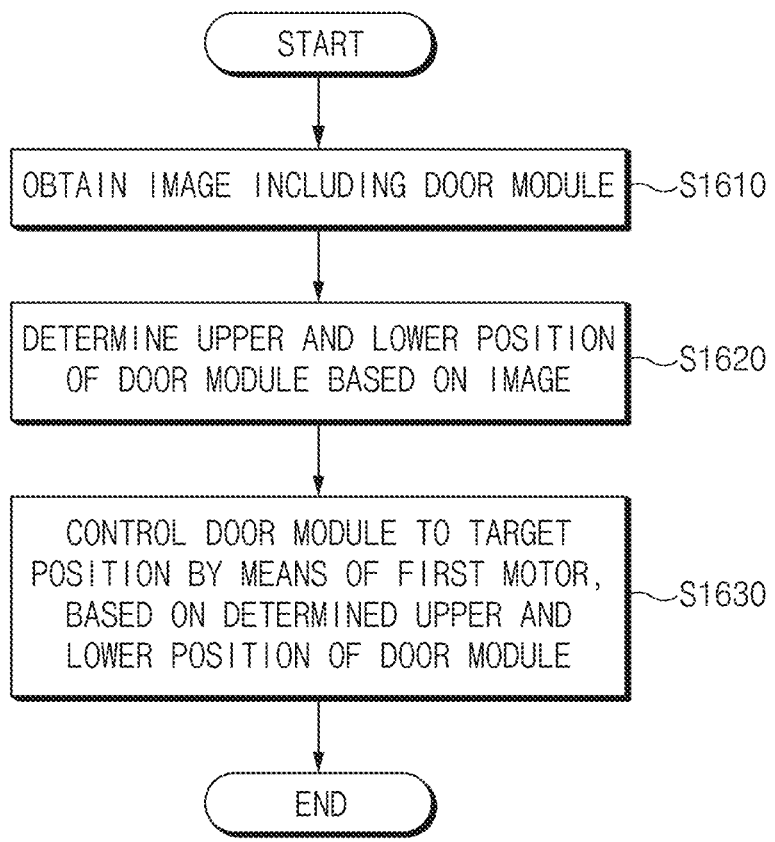
FIG. 16 is a flowchart illustrating a delivery robot control method according to an embodiment of the present disclosure.

FIG. 16 is a flowchart illustrating a delivery robot control method according to an embodiment of the present disclosure.

Referring to FIG. 16, the delivery robot control method may include obtaining (S1610) an image including a door module, determining (S1620) an upper and lower position of the door module, based on the image, and controlling (S1630) the door module to a target position by means of a first motor, based on the determined upper and lower position of the door module.

The obtaining (S1610) of the image including the door module may be performed by a camera 120 of FIG. 1.

The determining (S1620) of the upper and lower position of the door module, based on the obtained image, may be performed by a controller 130 of FIG. 1.

The determining (S1620) of the upper and lower position of the door module, based on the obtained image, may include determining, by the controller 130, the upper and lower position of the door module, based on an area or a length occupied by the door module in an image.

Although not illustrated, the delivery robot control method may further include detecting, by the controller 130, a position of an object moving on at least one of an internal conveyor, which may be controlled by a second motor to move the object from an internal loading space to the outside, and a conveyor which may be controlled by a third motor to move the object on the door module, by means of the image and controlling, by the controller 130, at least one of the second or the third motor, based on the detected position of the object.

As an example, the controlling of the at least one of the second motor or the third motor by the controller 130 may include stopping, by the controller 130, the second motor, when it is determined that the detected object deviates from the internal conveyor, based on the detected position of the object.

As an example, the controlling of the at least one of the second motor or the third motor by the controller 130 may include stopping, by the controller 130, the third motor, when it is determined that the detected object deviates from the door module, based on the detected position of the object, when the door module is located on the ground.

As an example, the controlling of the at least one of the second motor or the third motor by the controller 130 may include stopping, by the controller 130, the third motor, when it is determined that the detected object in the center of the door module on the door module, based on the detected position of the object, when the door module is not located on the ground.

The controlling (S1630) of the door module to the target position by means of the first motor, based on the determined upper and lower position of the door module may be performed by the controller 130.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the delivery robot control apparatus and the method thereof according to embodiments of the present disclosure.

According to at least one of embodiments of the present disclosure, the delivery robot control apparatus and the method thereof may be provided to control a delivery robot to unload an object.

Furthermore, according to at least one of embodiments of the present disclosure, the delivery robot control apparatus and the method thereof may be provided to safely and automatically unload an object upon absence of a customer.

Furthermore, according to at least one of embodiments of the present disclosure, the delivery robot control apparatus and the method thereof may be provided to separately deliver objects when delivering the objects to multiple destinations.

Furthermore, according to at least one of embodiments of the present disclosure, the delivery robot control apparatus and the method thereof may be provided to obtain the same effect as that where a person actually delivers an object.

Furthermore, according to at least one of embodiments of the present disclosure, the delivery robot control apparatus and the method thereof may be provided to structurally more simply and safely deliver an object than a method using a robot arm or a method of stacking up and carrying loads In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

Therefore, embodiments of the present disclosure are not intended to limit the technical spirit of the present disclosure, but provided only for the illustrative purpose.

What is claimed is:
1. A robot delivery control apparatus, comprising:
   a first motor provided in a delivery robot having an internal loading space accommodating one or more floors, wherein the first motor is configured to move a door module connected to a frame forming the internal loading space between the one or more floors and a ground;
   a camera provided in the delivery robot and configured to obtain an image including the door module; and
   a controller configured to determine a height-direction position of the door module based on the image and control the door module to a target position by the first motor based on the determined position of the door module.

2. The robot delivery control apparatus of claim 1, wherein the camera is mounted on the frame forming the internal loading space and configured to capture the image of the door module which is moving in an upward and downward direction, above the door module.

3. The robot delivery control apparatus of claim 1, wherein the controller is configured to determine the height-direction position of the door module based on an area or a length occupied by the door module in the obtained image.

4. The robot delivery control apparatus of claim 1, further comprising:
   a second motor configured to control an internal conveyor moving an object from the internal loading space to an outside; and
   a third motor provided in the door module and configured to control a conveyor moving an object on the door module,
   wherein the controller is configured to: detect a position of the object moving on at least one of the internal conveyor or the door module based on the obtained image, and control at least one of the second motor or the third motor based on the detected position of the object.

5. The robot delivery control apparatus of claim 4, wherein the controller is configured to stop the second motor when it is determined that the detected object deviates from the internal conveyor based on the detected position of the object.

6. The robot delivery control apparatus of claim 4, wherein the controller is configured to stop the third motor when it is determined that the detected object deviates from the internal conveyor based on the detected position of the object, and when the door module is located on the ground.

7. The robot delivery control apparatus of claim 4, wherein the controller is configured to stop the third motor when it is determined that the detected object is located at a center of the door module based on the detected position of the object, when the door module is not located on the ground.

8. The robot delivery control apparatus of claim 1, further comprising:
   a second motor configured to control an internal conveyor moving an object from the internal loading space to an outside;
   a third motor provided in the door module and configured to control a conveyor moving an object on the door module; and
   at least one of an ultrasonic sensor or an infrared sensor provided in the delivery robot and configured to identify a position of the object moving on at least one of the internal conveyor or the door module,
   wherein the controller is configured to control at least one of the second motor or the third motor based on the identified position of the object.

9. The robot delivery control apparatus of claim 1, further comprising:

a fourth motor provided on one side of the frame forming the internal loading space and configured to rotate the door module in a direction towards the internal loading space or a direction distant from the internal loading space, wherein the controller is configured to control the fourth motor based on a revolution per minute (RPM) of the fourth motor.

10. A robot delivery control apparatus, comprising:
a first motor provided in a delivery robot having an internal loading space accommodating one or more floors and configured to move a door module connected to a frame forming the internal loading space between the one or more floors and a ground;
a sensor device including:
 a motor sensor provided in the delivery robot and configured to measure revolutions per minute (RPM) of the first motor, and
 a first ultrasonic sensor or a first infrared sensor, which is configured to detect a height-direction position of the door module; and
a controller configured to control the door module to move to a target position by the first motor based on the detected height-direction position of the door module,
wherein the height-direction position is determined based on the measured RPM of the first motor, or by at least one of the first ultrasonic sensor or the first infrared sensor.

11. The robot delivery control apparatus of claim 10, further comprising:
a second motor configured to control an internal conveyor moving an object from the internal loading space to an outside;
a third motor provided in the door module and configured to control a conveyor moving an object on the door module; and
at least one of a second ultrasonic sensor or a second infrared sensor provided in the delivery robot and configured to detect a position of the object moving on at least one of the internal conveyor or the door module,
wherein the controller is configured to control at least one of the second motor or the third motor based on the detected position of the object.

12. The robot delivery control apparatus of claim 11, wherein the controller is configured to stop the second motor when it is determined that the object deviates from the internal conveyor based on the detected position of the object.

13. The robot delivery control apparatus of claim 11, wherein the controller is configured to stop the third motor when it is determined that the object deviates from the internal conveyor based on the detected position of the object, and when the door module is located on the ground.

14. The robot delivery control apparatus of claim 11, wherein the controller is configured to stop the third motor when it is determined that the object is located at a center of the door module based on the detected position of the object, and when the door module is not located on the ground.

15. A robot delivery control method, comprising:
obtaining, by a camera provided in a delivery robot having an internal loading space having one or more floors, an image including a door module provided in the delivery robot and connected to a frame forming the internal loading space;
determining, by a controller, a height-direction position of the door module based on the obtained image; and
controlling, by the controller, a first motor to move the door module to a target position based on the determined position of the door module.

16. The robot delivery control method of claim 15, wherein the determining of the position of the door module includes:
determining, by the controller, the height-direction position of the door module based on an area or a length occupied by the door module in the image.

17. The robot delivery control method of claim 15, further comprising:
detecting, by the controller, a position of an object moving on at least one of an internal conveyor which is controlled by a second motor to move an object from the internal loading space to an outside or a conveyor which is controlled by a third motor to move an object on the door module; and
controlling, by the controller, at least one of the second motor or the third motor based on the detected position of the object.

18. The robot delivery control method of claim 17, wherein the controlling of the at least one of the second motor or the third motor includes:
in response to determining that the object deviates from the internal conveyor based on the detected position of the object, stopping, by the controller, the second motor.

19. The robot delivery control method of claim 17, wherein the controlling of the at least one of the second motor or the third motor includes:
in response to determining that the object deviates from the door module based on the detected position of the object, and the door module is located on a ground, stopping the third motor.

20. The robot delivery control method of claim 17, wherein the controlling of the at least one of the second motor or the third motor includes:
in response to determining that the object is located at a center of the door module based on the detected position of the object, and the door module is not located on a ground, stopping the third motor.

* * * * *